United States Patent
Qiu et al.

(10) Patent No.: US 11,023,770 B2
(45) Date of Patent: Jun. 1, 2021

(54) SYSTEMS AND METHODS FOR OBTAINING TEMPLATES FOR TESSELLATED IMAGES

(71) Applicant: Hong Kong Applied Science and Technology Research Institute Co., Ltd., New Territories (HK)

(72) Inventors: Tian Qiu, Shatin (HK); Chi Shing Wong, Shatin (HK); Junlin Chen, Shatin (HK)

(73) Assignee: Hong Kong Applied Science and Technology Research Institute Co., Ltd., Shatin (HK)

(*) Notice: Subject to any disclaimer, the term of this patent is extended or adjusted under 35 U.S.C. 154(b) by 120 days.

(21) Appl. No.: 16/579,111

(22) Filed: Sep. 23, 2019

(65) Prior Publication Data

US 2021/0089806 A1 Mar. 25, 2021

(51) Int. Cl.
*G06K 9/46* (2006.01)
*G06T 17/20* (2006.01)
(Continued)

(52) U.S. Cl.
CPC .......... *G06K 9/4609* (2013.01); *G06T 3/0031* (2013.01); *G06T 5/40* (2013.01); *G06T 7/73* (2017.01); *G06T 17/20* (2013.01)

(58) Field of Classification Search
CPC ....... G06K 9/4609; G06T 7/73; G06T 3/0031; G06T 5/40; G06T 17/20
See application file for complete search history.

(56) References Cited

U.S. PATENT DOCUMENTS 7,025,515 B2* 4/2006 Woods .................... A61P 25/00
400/76
7,239,735 B2* 7/2007 Nozaki ............... G01N 21/8851
382/141
(Continued)

FOREIGN PATENT DOCUMENTS

CN 201110163823 A 9/2011
CN 104700415 A 6/2015
(Continued)

OTHER PUBLICATIONS

International Search Report and Written Opinion issued for PCT Application No. PCT/CN2019/111289, dated Jun. 23, 2020, 10 pages.
(Continued)

*Primary Examiner* — Manav Seth
(74) *Attorney, Agent, or Firm* — Norton Rose Fulbright US LLP

(57) ABSTRACT

Systems and methods which obtain template images corresponding to pattern units of tessellated images using a template unit boundary identification technique are described. Template unit boundary identification techniques of embodiments operate to analyze a sample of a tessellated image to determine a template unit size for the template image, use the determined template unit size to define pixel analysis line segments for identifying template unit boundaries in the tessellated image, and select a template image based on the template unit boundaries identified using the pixel analysis line segments. One or more sample area images may be selected for use in determining a template unit size. Pixel analysis line segments, configured based upon a determined template unit size, may be used for identifying boundaries of a template unit. Moreover, dynamic template image updating may be provided.

35 Claims, 14 Drawing Sheets

(51) Int. Cl.
*G06T 3/00* (2006.01)
*G06T 5/40* (2006.01)
*G06T 7/73* (2017.01)

(56) References Cited

U.S. PATENT DOCUMENTS

| | | | | |
|---|---|---|---|---|
| 7,332,250 B2* | 2/2008 | Misaka | ............... | G03F 7/70441 430/5 |
| 7,359,043 B2* | 4/2008 | Tsuchiya | ................. | G06T 7/001 356/237.1 |
| 7,466,854 B2* | 12/2008 | Sawa | ................. | G01B 11/028 348/126 |
| 7,501,213 B2* | 3/2009 | Misaka | ..................... | G03F 1/29 430/5 |
| 7,618,754 B2* | 11/2009 | Misaka | ............... | G03F 7/70283 430/5 |
| 7,796,801 B2* | 9/2010 | Kitamura | ................. | G06K 9/48 382/141 |
| 7,801,353 B2* | 9/2010 | Almogy | ................ | G03F 7/7065 382/141 |
| 7,884,322 B2* | 2/2011 | Sasajima | ................. | G06T 7/001 250/306 |
| 8,019,144 B2* | 9/2011 | Sugihara | ................... | G03F 1/84 382/141 |
| 8,081,839 B2* | 12/2011 | Hasegawa | ................. | G06T 5/40 382/274 |
| 8,213,722 B2* | 7/2012 | Kim | ...................... | G06T 7/0006 382/218 |
| 8,285,031 B2* | 10/2012 | Kitamura | ................ | G06T 7/001 382/145 |
| 8,386,968 B2* | 2/2013 | Pang | ......................... | G03F 1/36 716/52 |
| 8,434,031 B2* | 4/2013 | Granik | ...................... | G03F 1/36 716/54 |
| 8,705,131 B2* | 4/2014 | Woods | ................. | H04N 1/4055 358/3.01 |
| 9,098,893 B2* | 8/2015 | Dalia-Torre | ............ | G06T 7/001 |
| 9,858,659 B2* | 1/2018 | Minakawa | .............. | G06T 7/001 |
| 10,262,241 B2 | 4/2019 | Bai et al. | | |
| 10,290,094 B2* | 5/2019 | Isomura | .................. | G06T 7/001 |
| 10,535,129 B2* | 1/2020 | Kitazawa | ................ | G06T 7/001 |
| 2002/0002679 A1* | 1/2002 | Murakami | ................. | G06T 7/73 713/176 |
| 2003/0086616 A1 | 5/2003 | Oh et al. | | |
| 2003/0198388 A1 | 10/2003 | Wenzel et al. | | |
| 2008/0099676 A1* | 5/2008 | Sasajima | ................. | G06T 7/001 250/307 |
| 2009/0214104 A1* | 8/2009 | Sugihara | ................. | G06T 7/001 382/145 |
| 2019/0272411 A1 | 9/2019 | Zou et al. | | |

FOREIGN PATENT DOCUMENTS

| | | |
|---|---|---|
| CN | 104851085 A | 8/2015 |
| CN | 201510968421 A | 5/2016 |
| CN | 106326901 A | 1/2017 |
| CN | 108961291 A | 12/2018 |
| CN | 109087289 A | 12/2018 |
| CN | 109242858 A | 1/2019 |
| CN | 109859226 A | 6/2019 |
| EP | 3460715 A1 | 3/2019 |

OTHER PUBLICATIONS

Steven W. Smith, The Scientist and Engineer's Guide to Digital Signal Processing, 107-122, California Technical Pub., 1st ed., 1997.

* cited by examiner

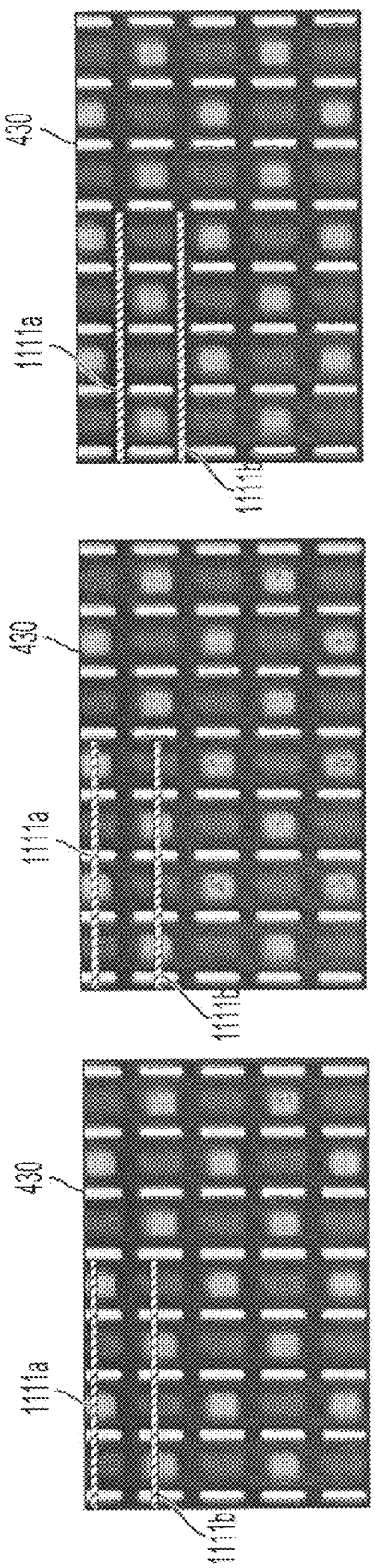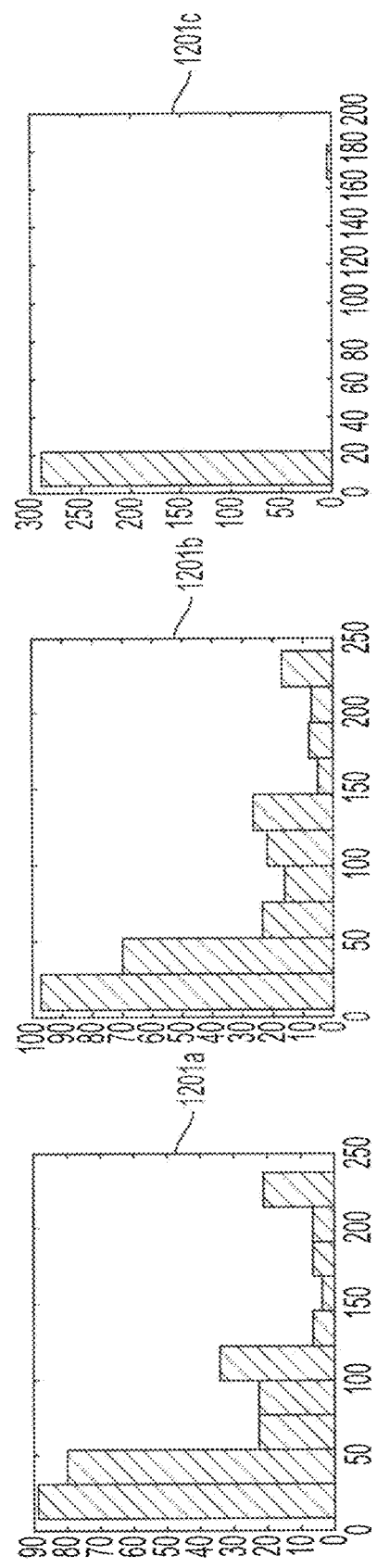
FIG. 12A  FIG. 12B  FIG. 12C

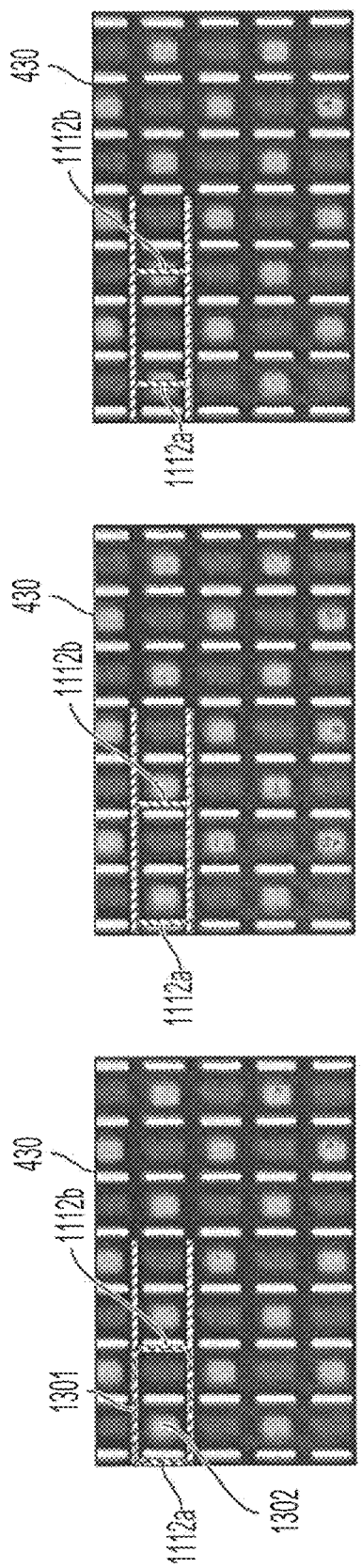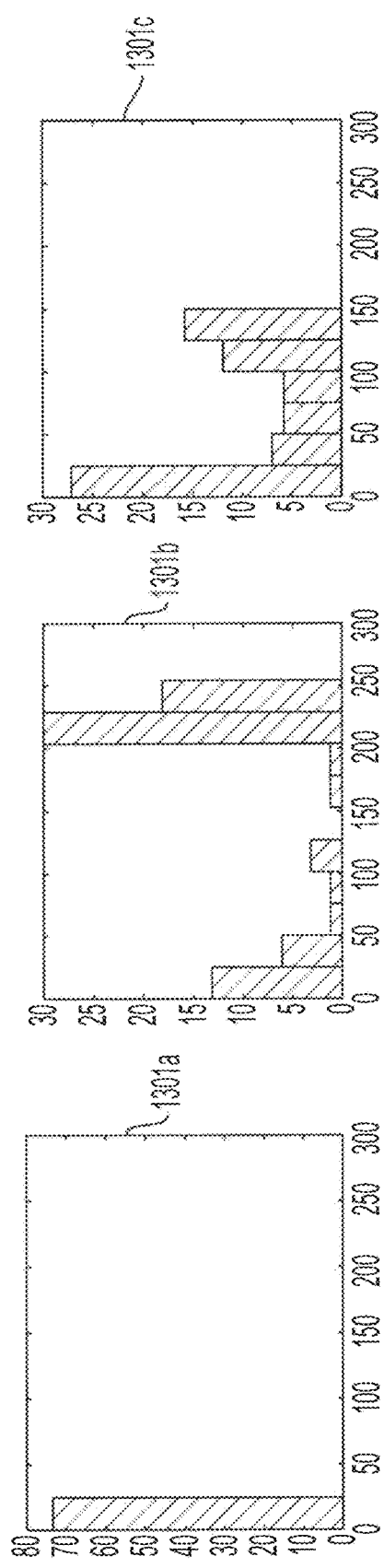
FIG. 13A    FIG. 13B    FIG. 13C

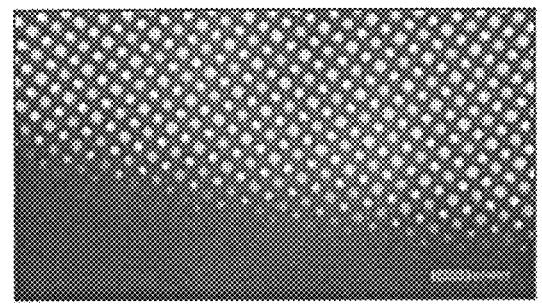
FIG. 14A
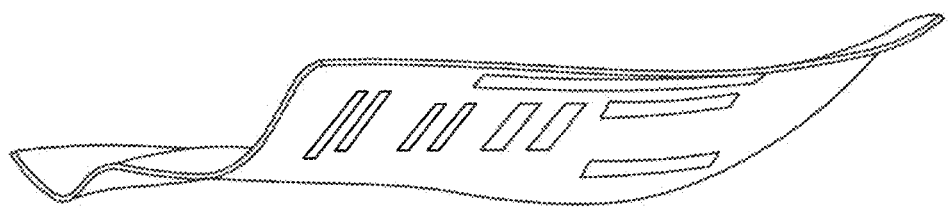
FIG. 14B
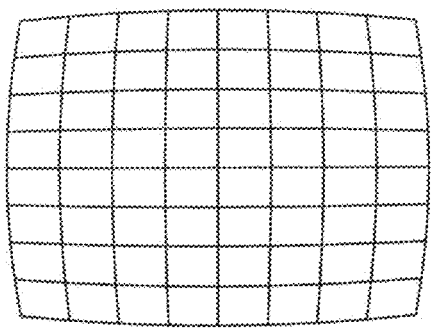 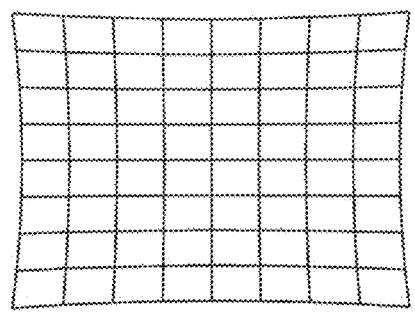
FIG. 14C　　　　　　　　FIG. 14D

SYSTEMS AND METHODS FOR OBTAINING TEMPLATES FOR TESSELLATED IMAGES

TECHNICAL FIELD

The present invention relates generally to digital imaging and, more particularly, to techniques for obtaining template images corresponding to pattern units of tessellated images.

BACKGROUND OF THE INVENTION

Tessellated images (i.e., images having a plurality of repeated, non-overlapping units forming a pattern) are widely used in various daily consumables and industrial products. For example, integrated circuit dies (i.e., individual blocks of a functional circuit) are typically fabricated in a tessellated pattern on the surface of a silicon wafer providing a multi-unit aggregation, wherein the wafer is cut (diced) into many pieces to provide the individual integrated circuits. Similarly, printed goods (e.g., currency, stamps, pages of books, etc.) are often produced in a tessellated pattern by printing multiple instances of the goods on the surface of a large sheet of print stock providing a multi-unit aggregation, wherein the print stock is cut into many pieces to provide the individual printed goods. Tessellated images (e.g., digital images capturing all or some portion of a multi-unit aggregation comprising a tessellated pattern of repeated units) of such multi-unit aggregations may be used in various aspects of the production of such items.

Many industrial applications, such as electronic assembly and semiconductor manufacturing processes, require location of each unit with the same pattern on a tessellated image for defect inspection. For example, tessellated images may be used in an inspection. system for quality control with respect to the individual items of the multi-unit aggregation. As another example, tessellated images may be used for making cuts to separate the individual units from the multi-unit aggregation.

Traditionally, operators mark each pattern unit on a tessellated image manually. This process is very time-consuming. Moreover, the marking of the pattern units by different operators is often not consistent leading to poor quality control results, unit separation inconsistencies, etc. Accordingly, techniques for automating the identifying positions of the pattern units within tessellated images have been developed.

Template matching techniques have been used in digital image processing for finding small portions within a digital source image scene (referred to herein as a "source image") corresponding to a digital reference image template (referred to herein as a "template image"). Such template matching techniques may, for example, be utilized with the aforementioned tessellated images (e.g., provided as the source image) to locate the positions the individual units of the multi-unit aggregation by matching a template image corresponding to an instance of the repeated unit to a portion of the source image.

Traditional methods for template matching techniques have required manual identification and selection of the templates. Accordingly, although locating individual units within a multi-unit aggregation may be automated, obtaining the template image used in the automated template matching process is nevertheless manual and continues to suffer from issues with respect to being time-consuming and inconsistent. Generally, the template image is a one-time template that is used until the process is finished. Accordingly, the manual identification and selection of a template image is repeated for each time the template matching process is used, thus propagating the aforementioned issues with respect to consistency and operator time to identify the template. Moreover, current template matching techniques do not provide for dynamically updating a template image.

There has been research recently focusing on the algorithm speed and accuracy improvement for template matching. However, heretofore there has been little research with respect to identification and selection of the template images used in template matching techniques.

BRIEF SUMMARY OF THE INVENTION

The present invention is directed to systems and methods which obtain template images corresponding to pattern units of tessellated images, comprising multi-unit aggregations of tessellated pattern units, using a template unit boundary identification technique. The template unit boundary identification techniques of embodiments of the invention operate to analyze a tessellated image using a sample area image from the tessellated image to determine a template unit size for the template image, use the determined template unit size to define pixel analysis line segments for identifying template unit boundaries in the tessellated image, and select a template image based on the template unit boundaries identified using the pixel analysis line segments. Such template unit boundary identification techniques provide a methodology facilitating automated template image identification, selection, and capture (singularly and collectively referred to herein as template image retrieval). Automated template image retrieval implemented according to template unit boundary identification techniques of the present invention not only reduce the processing time for obtaining template images, but also provide more consistent results than previous techniques. Moreover, embodiments enable dynamic template image updating, such as to provide for adapting a template image to accommodate pattern unit anomalies (e.g., fuzzy border, distortion, etc.) within the multi-unit aggregation of the tessellated image.

In operation according to embodiments of the invention one or more sample area images, comprising a subset of a source tessellated image, are selected for use in determining a template unit size. A source image of embodiments is then analyzed using the one or more sample area images for determining a minimal distance between a repeating pattern, wherein the determined distance may be utilized in determining the template unit size. For example, a convolution may be performed with respect to a sample area image from the source image and the source tessellated image, wherein local maximum peaks from the convolution results may be utilized in determining the template unit size.

Embodiments of the invention use pixel analysis line segments configured for identifying boundaries of a template unit, wherein a configuration of the pixel analysis line segments may be based upon a template unit size determined from analyzing one or more samples (e.g., source image samples) of the tessellated image. For example, pixels corresponding to positions of a plurality of pixel analysis line segments may be analyzed with respect to predetermined criteria (e.g., substantially uniform pixels along juxtaposed pixel analysis line segments). Template unit boundaries identified according to embodiments may be utilized to retrieve (e.g., identify, select, and/or capture) a template image from the tessellated image. Such template images may, for example, be used in template matching techniques to locate the positions the individual pattern units of the multi-unit aggregations within tessellated images.

In operation according to embodiments of the invention, template unit boundary identification techniques facilitate automatic template image retrieval for various configurations of two-dimensional (2D) rectangular tessellated images. For example, the use of pixel analysis line segments by template unit boundary identification techniques of embodiments accommodate vertically and horizontally aligned rectangular tessellated images, vertically aligned and horizontally staggered rectangular tessellated images, and vertically staggered and horizontally aligned rectangular tessellated images.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures, it is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which:

FIGS. 12A-12C show vertical sliding of juxtaposed horizontal pixel analysis line segments over a source image for analyzing pixels of the source image for predetermined criteria according to embodiments of the present invention;

FIGS. 13A-13C show horizontal sliding of juxtaposed vertical pixel analysis line segments over a source image for analyzing pixels of the source image for predetermined criteria according to embodiments of the present invention;

FIGS. 14A-14D show example source images in which the pattern units of an multi-unit aggregation do not appear completely uniform within the tessellated image according to embodiments of the present invention.

DETAILED DESCRIPTION OF THE INVENTION

Figure 1:
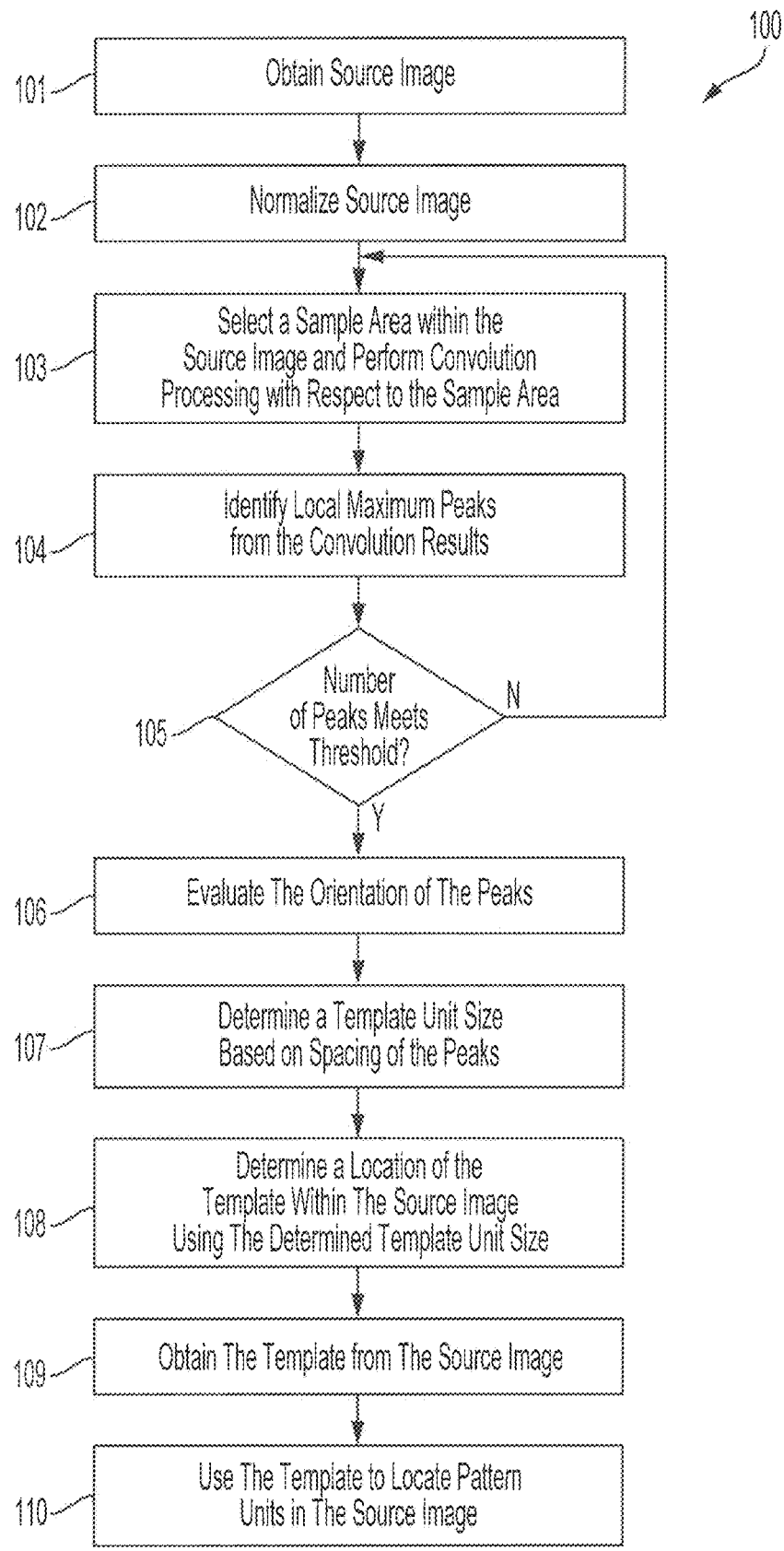
FIG. 1 shows a flow diagram of template unit boundary identification operation using a determined template unit size according to embodiments of the present invention.
Figure 2:
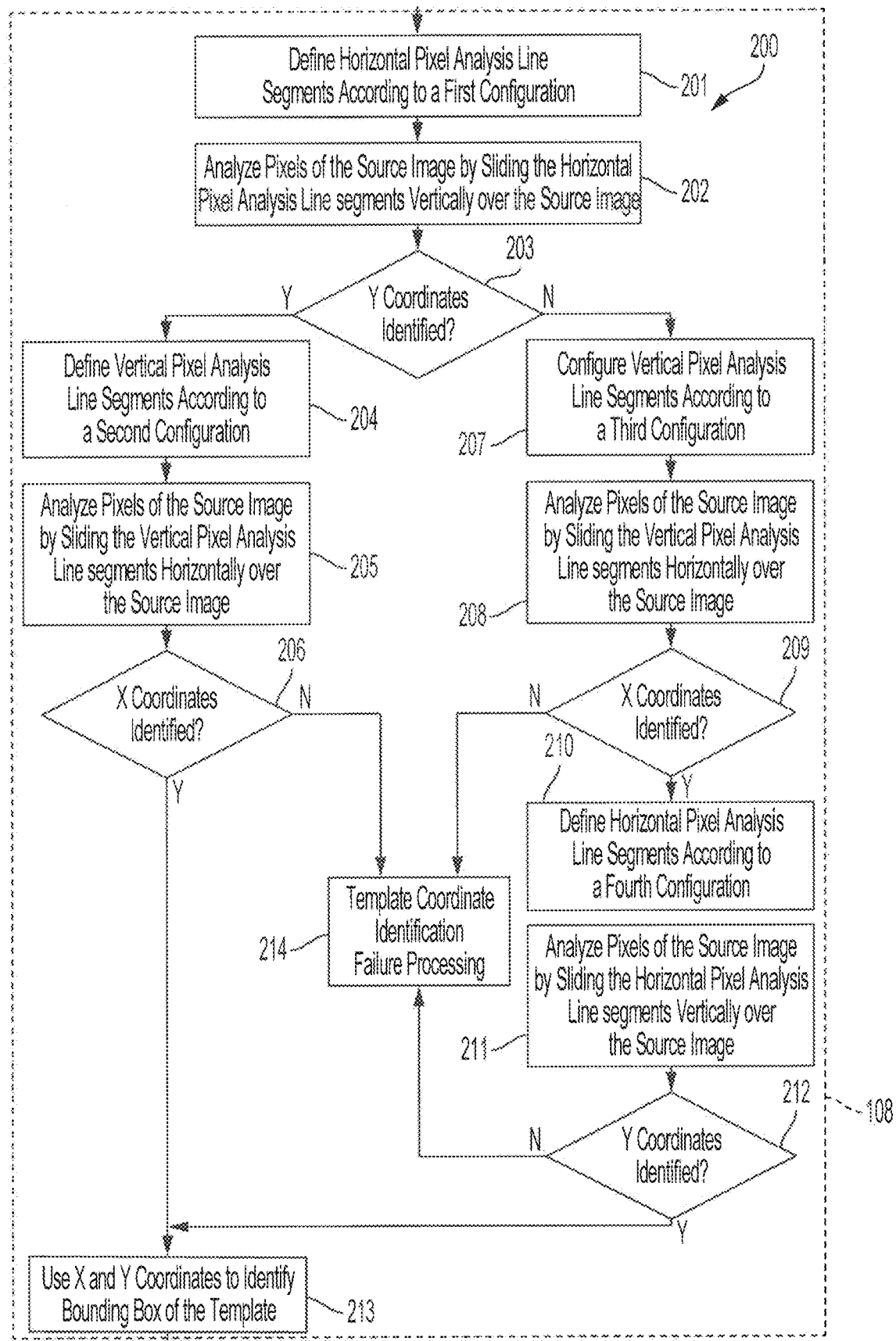
FIG. 2 shows a flow diagram of operation to identify template unit boundaries in the tessellated image using pixel analysis line segments according to embodiments of the present invention.

FIGS. 1 and 2 show flow diagrams providing operation according to template unit boundary identification techniques of the present invention to obtain template images corresponding to pattern units of tessellated images comprising multi-unit aggregations. In particular, and as will be described in further detail below, flow 100 of FIG. 1 provides an exemplary embodiment of template unit boundary identification operation in which one or more samples of a tessellated image are analyzed to determine a template unit size for the template image, the determined template unit size is used to define pixel analysis line segments for identifying template unit boundaries in the tessellated image, and a template image is selected based on the template unit boundaries identified using the pixel analysis line segments. Also as will be described in further detail below, flow 200 of FIG. 2 provides detail of an exemplary embodiment identifying template unit boundaries in the tessellated image using pixel analysis line segments in accordance with concepts of the present invention.

The template unit boundary identification techniques of the exemplary embodiments shown in FIGS. 1 and 2 provide a methodology facilitating automated template image template image retrieval. It should be appreciated that, when implemented in software, the functions of flows 100 and 200 providing aspects of template unit boundary identification techniques of embodiments of the present invention may comprise code segments to perform the tasks as described herein. The code segments can be stored in a processor readable medium for execution by one or more processors of a processor-based system. The processor readable medium may include any medium that can suitably store and transfer information. Examples of the processor readable medium include an electronic circuit, a semiconductor memory device, a read only memory (ROM), a flash memory, an erasable ROM (EROM), an optical disk, a hard disk, etc. The code segments may be downloaded via computer networks such as a local area network (LAN), a wide area network (WAN), the Internet, an intranet, a cellular communication network, etc.

Figure 3:
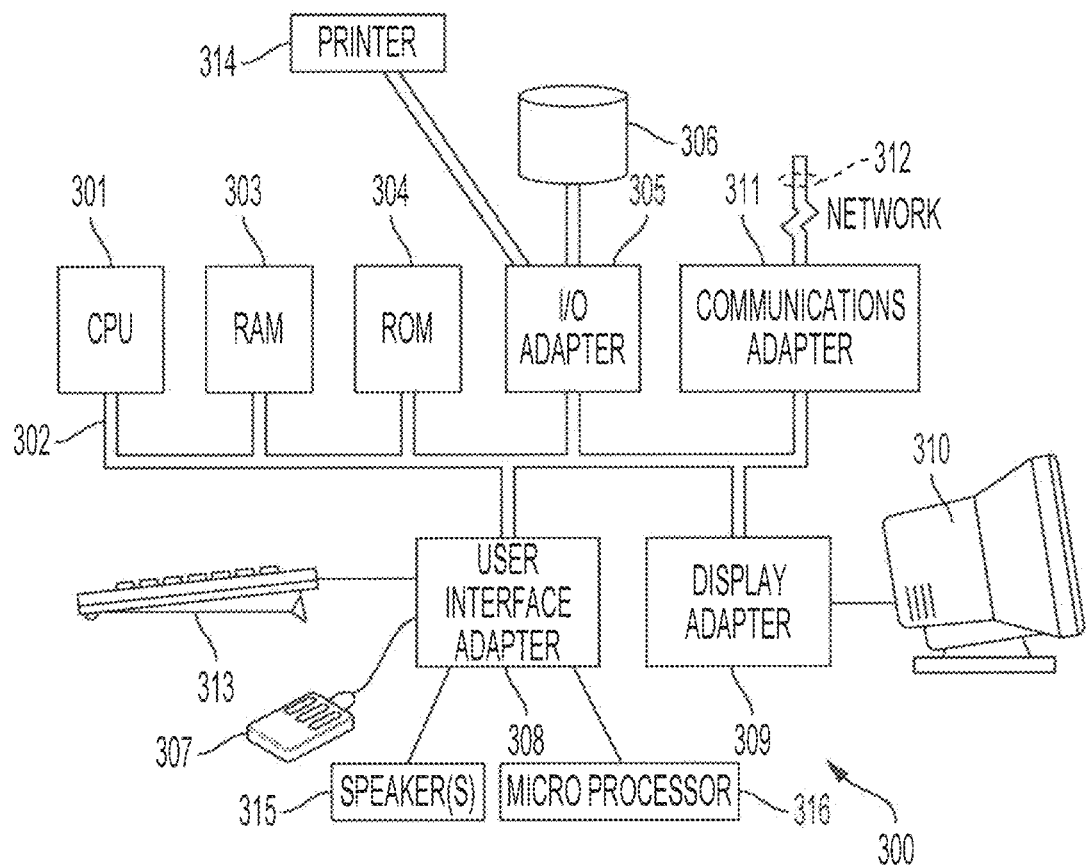
FIG. 3 shows a processor-based system configured for template unit boundary identification operation according to embodiments of the present invention.

FIG. 3 shows processor-based system 300 (e.g., server system, personal computer system, notebook computer system, tablet system, smartphone system, etc.) configured to implement template unit boundary identification techniques according to embodiments of the present invention. In the illustrated embodiment of processor-based system 300, central processing unit (CPU) 301 is coupled to system bus 302. CPU 301 may comprise a general purpose CPU, such as a processor from the CORE family of processors available from Intel Corporation, a processor from the ATHLON family of processors available from Advanced Micro Devices, Inc., a processor from the POWERPC family of processors available from the AIM Alliance, etc. However, the present invention is not restricted by the architecture of CPU 301 as long as CPU 301 supports the inventive operations as described herein. For example, CPU 301 of embodiments may comprise one or more special purpose processors, such as an application specific integrated circuit (ASIC), a graphics processing unit (GPU), a field programmable gate array (FPGA), etc. Bus 302 couples CPU 301 to random access memory (RAM) 303 (e.g., SRAM, DRAM, SDRAM, etc.) and ROM 304 (e.g., PROM, EPROM, EEPROM, etc.). RAM 303 and ROM 304 hold user and system data and programs, such as may comprise some or all of the aforementioned program code for performing functions of template unit boundary identification and data associated therewith.

Bus 302 of the illustrated embodiment of processor-based system 300 is also coupled to input/output (I/O) controller 305, communications adapter 311, user interface adapter 308, and display adapter 309. I/O controller 305 couples to storage device 306 (e.g., one or more of a hard drive, optical drive, solid state drive, etc.), to CPU 301 and RAM 303, such as to exchange program code for performing functions of template unit boundary identification and/or data associated therewith. I/O adapter 305 of the illustrated embodiment is also connected to printer 314 (e.g. dot matrix printer, laser printer, ink jet printer, thermal printer, etc.), which would allow the system to print paper copies of information such as template images, matched pattern information obtained using template images, and/or other information and documents. Communications adapter 311 is configured to couple processor-based system 300 to network 312 (e.g., a cellular communication network, a LAN WAN, the Internet, etc.). User interface adapter 308 of the illustrated embodiment couples user input devices, such as keyboard 313, pointing device 307, and microphone 316, to other components of processor-based system 300. User interface adapter 308 of the illustrated embodiment also provides sound output to a user via speaker(s) 315. Display adapter 309 is driven by CPU 301 to control the display on display device 310 (e.g., flat panel display, touch screen, heads-up display, holographic projector, etc.).

Referring again to FIG. 1, the template unit boundary identification operation of the exemplary embodiment therein facilitates automatic retrieval of template images corresponding to pattern units of regular rectangular grids from diverse and sometimes dazzling patterns within tessellated images. Such template unit boundary identification techniques may, for example, be implemented with respect to an optical inspection system (e.g., defect inspection for various industry applications), wherein dividing each unit from the whole repeating pattern can make the inspection more reliable and effective. It should be appreciated, however, that in many industries the product shapes or features within the products may change often (e.g., daily), making template selection and template matching challenging. Dynamic template update operation provided according to embodiments of the template unit boundary identification technique illustrated in FIG. 1 may nevertheless be relied upon to provide a complete automated solution to retrieve template images for template matching operation.

Figure 4:
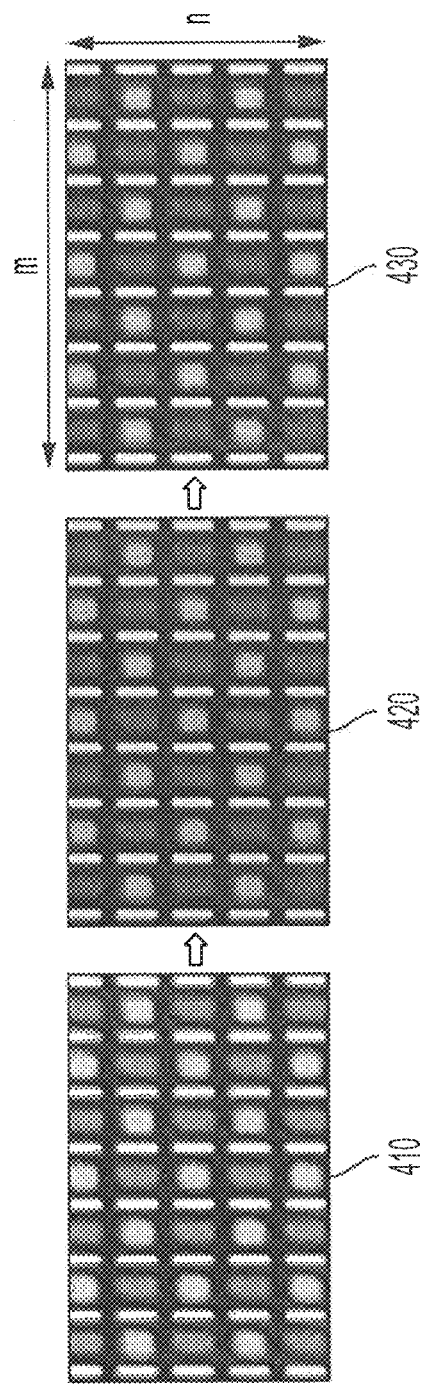
FIG. 4 shows various exemplary forms of a source image as may be utilized in template unit boundary identification according to embodiments of the present invention.

At block 101 of the embodiment illustrated in FIG. 1, a source image is obtained. A source image of embodiments may be obtained, for example, using a line scan camera, an area scan camera, etc. The source image comprises a tessellated image having a plurality of repeated, non-overlapping units (referred to herein as pattern units) forming a pattern from which a template image is to be obtained. For example, source images obtained according to embodiments of the invention (e.g., source image 410 of FIG. 4) may comprise two-dimensional (2D) rectangular tessellated images of various configurations. In accordance with embodiments of the invention, the tessellated image comprises an image of an item, such as a silicon wafer comprising a plurality of integrated circuit dies, a printed composite of a plurality of goods, etc., such as may be captured during processing of the item (e.g., during manufacturing, inspection, packaging, etc.). Embodiments of the invention can accommodate tessellated images where there is a clear edge separating the pattern units, and where there is no clear edge separating the pattern units.

In operation according to embodiments of the invention, the tessellated pattern within the source image is approximately in a normal placed position. For example, rows and/or columns of pattern units within a multi-unit aggregation of a tessellated pattern of a source image are oriented in a geometric normal position (e.g., rows oriented substantially along a 90°/270° axis and/or columns oriented substantially along a 0°/180° axis), rather than a randomly rotated position.

The source image is normalized, such as to enhance the contrast of the input image, at step 102 of flow 100 of the illustrated embodiment. For example, in providing normalization according to embodiments of the invention, source image 410 may be converted from a color image to a grey scale image (e.g., grey scale source image 420 of FIG. 4) and the grey scale values normalized (e.g., providing normalized source image 430). As one example, grey scale source image 420 may be normalized with a maximum grey scale intensity (e.g., providing dynamic range correction) to provide enhanced contrast with respect to normalized source image 430. In accordance with an exemplary embodiment, normalization may comprise standardization of the grey scale source image to convert the pixel intensity values to zero-scores forming a standardized data set, which retains the statistical properties of the original pixels, but has mean 0 and standard deviation 1. For the source image grey levels x with mean μ and standard deviation σ, the zero-score of a value x is as:

$$z = \frac{x - \mu}{\sigma} \quad (1)$$

Such standardization of the pixel intensity values provides normalization where the scaling factor is the standard deviation of the pixel intensity across the portion of the source image processed.

Processing of a source image may include manipulation of the source image, or some portion thereof, in addition to or in the alternative to normalization. For example, if the source image is large (e.g., over 800 by 600 pixels or 1000 by 1000 pixels), source image processing at step 102 may comprise reducing the size of the source image for normalization by cropping the source image (e.g., cutting out a 800 by 600 pixel portion of the image, such as from the top left corner, or some other position, of the source image) for normalization. Such reduction of the size of the source image as processed by template unit boundary identification operation may, for example, speed up calculations and/or other functionality.

Figure 5:
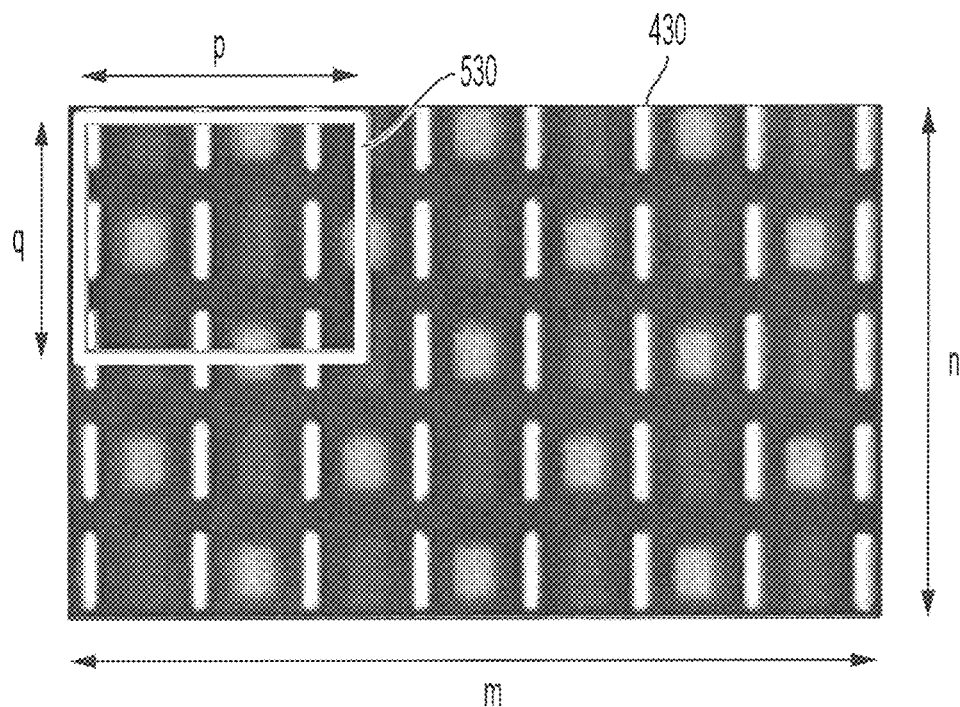
FIG. 5 shows a sample area selected with respect to a source image for determining a template unit size according to embodiments of the present invention.

Continuing with flow 100 of FIG. 1, a sample area within the source image (or portion thereof) is selected at block 103 for use in template unit boundary identification processing according to embodiments. For example, where normalized source image 430 (or the portion of the source image being processed according to the template unit boundary identification technique) is of size m by n pixels, sample area 530 of size p by q pixels may be selected (e.g., from the top left corner, or some other position, of the source image) for analysis to determine a template unit size for the template image, as shown in FIG. 5. In accordance with embodiments of the invention the sample area comprises a subset of the source image such that p<m and q<n. The size of the sample area (noted as p by q) is preferably selected so that p is from ⅛ to ½ of m, and q is ⅛ to ½ of n.

In operation according to embodiments, the size of the sample area is selected so as to be greater than the size of a template unit size. However, the size of the template unit size is unknown, and is ultimately being determined using the sample area according to embodiments. Accordingly, embodiments of the present invention operate at block 103 to initially select a size of sample area at the larger end of the range of sample area sizes (e.g., p=½ of m, and q=½ of n), wherein later iterations of operation at block 103 select a size of sample area more towards the smaller end of the range of sample area sizes (e.g. p<½ of m up top p=⅛ of m, and q<½ of n up to q=⅛ of n). It should be appreciated that, although embodiments select a sample area size sufficiently large so as to be greater than the size of a template unit size, the sample area size selected is preferably selected (or reselected, as discussed below) so as to be sufficiently small to facilitate identifying sufficient repetition of the pattern units within the source image.

Figure 6:
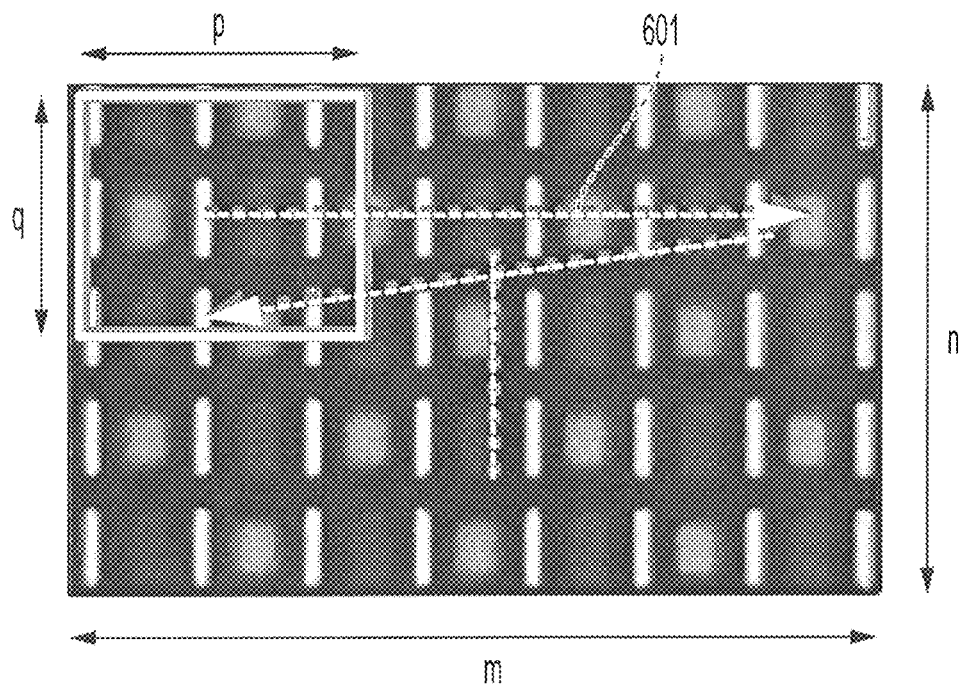
FIG. 6 shows an exemplary convolution path as may be used with respect to a sample area image and corresponding source image for determining a template unit size according to embodiments of the present invention.

In facilitating analysis to determine a template unit size for the template image according to embodiments of the invention, a portion of the source image (e.g., normalized source image 430) corresponding to the sample area (e.g., sample area 530) may be used as a convolutional core for performing convolution processing with respect to the source image. For example, the sample area image (e.g., source image portion corresponding to sample area 530) may be moved along a convolution path (e.g., convolution path 601 of FIG. 6) to perform pixel by pixel convolutional calculations traversing the extent of the source image (e.g., normalized source image 430). Such pixel by pixel convolutional calculations may be applied according to the following principle, wherein the source image of size m by n is denoted as A and the sample area image of size p by q is denoted as B. For discrete, two-dimensional variables A and B, the following equation defines the convolution:

$$C(r,c)=\Sigma_{k=0}^{p-1}\Sigma_{j=0}^{q-1}B(k,j)A(r+k-p+1,c+j-q+1), \quad (2)$$

where C is the convolution result graph, r and c is the coordinate of the convolution result graph with $0 \le r < p+m-1$ and $0 \le c < q+n-1$. Further information regarding convolutional calculation as may be utilized according to embodiments of the invention is provided in Steven Smith, "The Scientist and Engineer's Guide to Digital Signal Processing", California Technical Pub, 1997 (ISBN 10: 0966017633), incorporated herein by reference.

Figure 7:
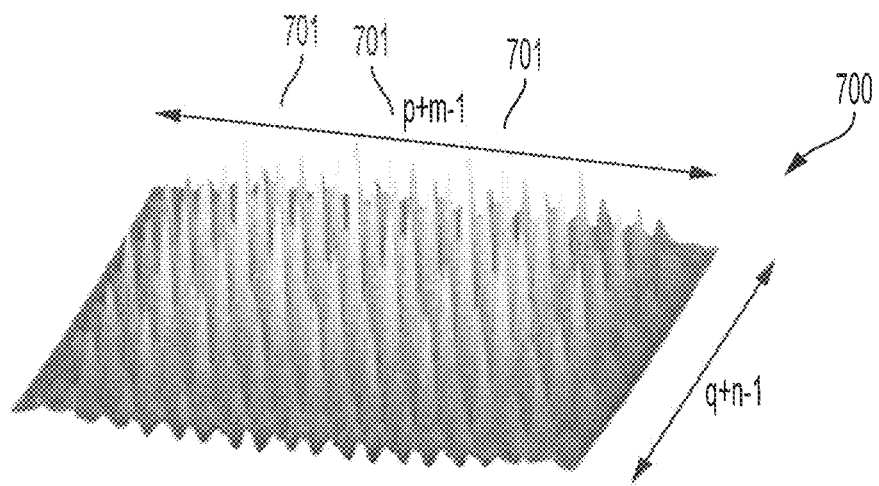
FIG. 7 shows an example convolution graph comprising peaks resulting from convolution processing of a sample area image and corresponding source image as may be used in determining a template unit size according to embodiments of the present invention.

At block 104 of flow 100 of embodiments, results of convolution processing with respect to the sample area image and the source image are analyzed to identify local maximum peaks. For example, the above mentioned pixel by pixel convolutional calculations for the sample area image traversing the extent of the source image may provide results as illustrated in convolution graph 700 of FIG. 7, illustrating peaks 701 resulting from convolution processing of the sample area image and the source image. A local maximum method may be utilized with respect to peaks 701 of convolution graph 700 to identify peaks corresponding to the centers of blocks (e.g. pattern units of the multi-unit aggregation) that have the highest similarity between the convolved images the sample area image and the source image). Various local maximum methods may be utilized to identify peaks according to embodiments of the invention. One such local maximum method may, for example, use a predefine threshold (e.g., 80% of the Max value in the convolution graph), whereby blob analysis may be used to determine how many blobs contain the local peak in this image, and for each blob the position from the maximum value inside the blob may be used to determine the local maximum position. Irrespective of the particular local maximum method used, the identified local maximum peaks may be used to create a peak map utilized according to embodiments in determining a template unit size.

Figure 8:
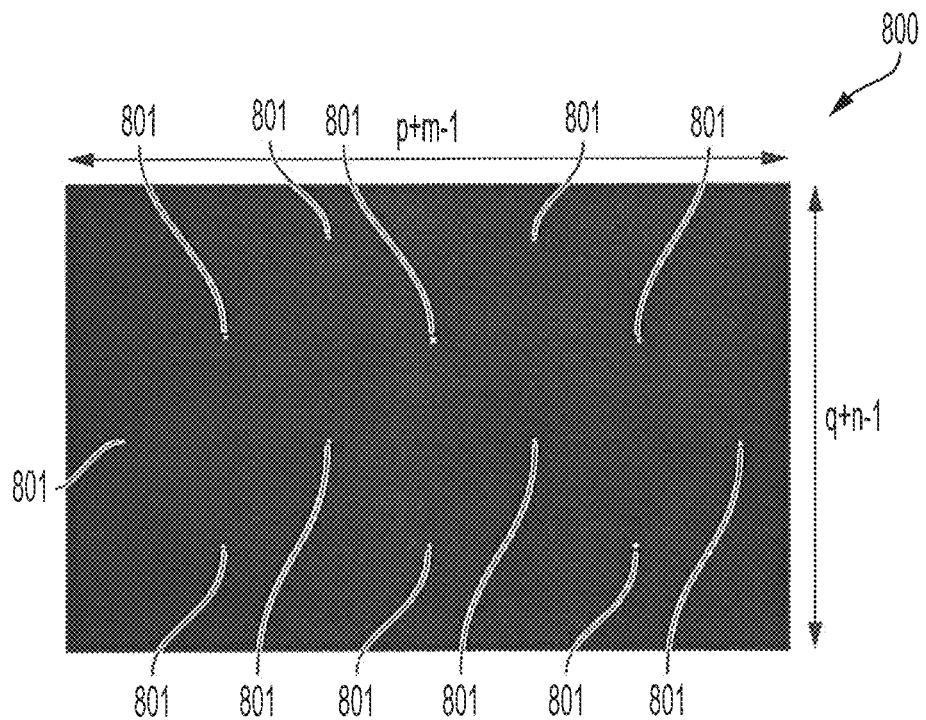
FIG. 8 shows an example peak map identifying peaks representing centers of putative pattern units as may be used in determining a template unite size according to embodiments of the present invention.

FIG. 8 shows an example of peak map 800 comprising peaks of convolution graph 700 identified as peaks corresponding to the centers of blocks that are similar between the convolved images. Accordingly, peaks 801 of peak map 800 correspond to centers of putative pattern units of the multi-unit aggregation in the tessellated source image.

At block 105 of the embodiment illustrated in FIG. 1, a determination is made regarding whether the number of peaks identified from the convolution processing meets a peak threshold. For example, peak map 800 may be analyzed to determine if the number of peaks 801, representing centers of putative pattern units, is larger than a threshold number for determining (or reliably determining) template unit size according to embodiments. In operation according to embodiments of a template unit boundary identification technique, a threshold is predetermined with respect to a minimum number of peaks for determining template unit size. As an example, a minimum number of peaks (e.g., the threshold number of peaks 801 in peak map 800) for proceeding to determine a template unit size may be established to be 4 (e.g., peak threshold=4, such that the number of peaks in peak map≥the peak threshold). The peak threshold utilized according to embodiments may comprise aspects in addition to a single minimum value. For example, the peak threshold may comprise sub-minimums, such as a minimum number of peaks horizontally and/or a minimum number of peaks vertically (e.g., peak threshold=4, wherein the peak threshold comprises horizontal peak threshold=2 and vertical peak threshold 2, to provide a 2 by 2 peak threshold configuration).

If, at block 105, it is determined that the number of peaks identified from the convolution processing does not meet the peak threshold, processing according to the illustrated embodiment of flow 100 returns to block 103 to reselect a sample area within the source image for performing convolution processing. For example, where the number of peaks identified from the convolution processing is less than a peak threshold predetermined as a minimum number of peaks for determining (or reliably determining) template unit size, the sample area size is likely so large as to have identified sufficient repetition of the pattern units within the source image. Accordingly, embodiments of the invention return to block 103 to reselect a reduced size of sample area more towards the smaller end of the range of sample area sizes (e.g., $p_N < p_{N-1}$, where $p_N < \frac{1}{2}$ of m up to $p_N = \frac{1}{8}$ of m, and $q_N < q_{N-1}$, where $q_N < \frac{1}{2}$ of n up to $q_N = \frac{1}{8}$ of n). Thereafter, the above mentioned convolution processing may be performed with respect to the sample area image for the reselected sample area size to determine if a number of peaks meeting the peak threshold are identified.

If, however, it is determined at block 105 that the number of peaks identified from the convolution processing meets the peak threshold, processing according to the illustrated embodiment of flow 100 proceeds to further processing for determining the template unit size. For example, where the number of peaks identified from the convolution processing is greater than or equal to a peak threshold predetermined as a minimum number of peaks for determining (or reliably determining) template unit size, the sample area size is likely sufficiently large so as to be greater than the size of a template unit size and sufficiently small to facilitate identifying sufficient repetition of the pattern units within the source image.

Figure 9:
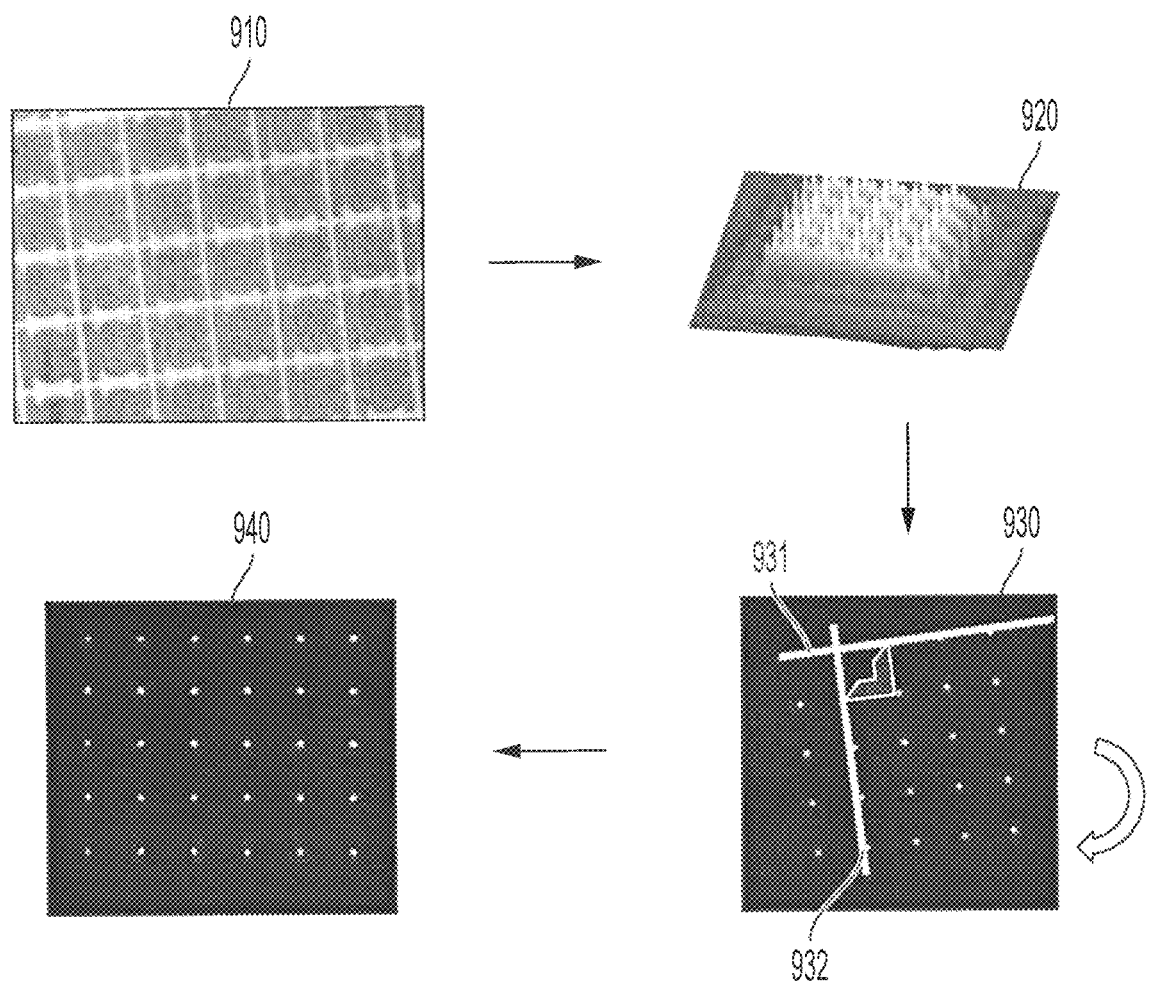
FIG. 9 shows rotation calibration as may be applied to facilitate template unit boundary identification according to embodiments of the present invention.

At block 106 of the embodiment of FIG. 1, the orientation of the peaks identified as corresponding to putative pattern units of the multi-unit aggregation in the tessellated source image is analyzed. For example, the orientation of peaks 801 of peak map 800 may be analyzed to determine if they are oriented in a geometric normal position (e.g., rows oriented substantially along a 90°/270° axis and/or columns oriented substantially along a 0°/180° axis), To aid in understanding the foregoing, the tessellated pattern within a source image (e.g., normalized source image 910 of FIG. 9) may not be in a normal placed position (e.g., the rows and columns of pattern units within the multi-unit aggregation of the tessellated pattern of normalized source image 830 are rotated off of a geometric normal position, wherein the rows are oriented approximately along a 85°/265° axis and/or columns oriented approximately along a 355°/175° axis). The above mentioned pixel by pixel convolutional calculations for a sample area image traversing the extent of this source image provide results in which the peaks of the convolution graph are not in a normal placed position, as illustrated in convolution graph 920 of FIG. 9. Correspondingly, the peaks of a resulting peak map comprising peaks of the convolution graph identified as peaks corresponding to the centers of blocks that are similar between the convolved images are not in a normal placed position, as illustrated in peak map 930 of FIG. 9. In particular, lines fitted to the peaks of peak map 930 (e.g., horizontal fitted line 931 and vertical fitted line 931) are neither horizontal or vertical.

In operation at block 106 of embodiments, if the orientation of the peaks identified as corresponding to putative pattern units are determined not to be suitably in a geometric normal position (e.g., fitted lines are rotated off of horizontal and/or vertical more than a predetermined amount, such as ±1°), a rotation calibration may be applied according to the orientation of the main fitted lines to facilitate template unit boundary identification. For example, an amount of rotation for horizontal fitted line 931 with respect to a horizontal axis (e.g., 90°/270° axis) and an amount of rotation for vertical fitted line 932 with respect to a vertical axis (e.g., 0°/180° axis) may be determined and peak map 930 rotated to bring the orientation of horizontal fitted line 931 and vertical fitted line 932 to within a predetermined rotation threshold amount (e.g., ±1°), as illustrated in peak map 940 of FIG. 9.

If after rotation, the fitted lines are not perpendicular, an Affine Transformation may be performed with respect to the peaks of the peak map to make the fitted lines perpendicular. A standard Affine Transformation may provide reflection, Scale, rotate, Shear and translate the image while ensuring that parallel lines remain parallel. Embodiments of the present invention utilize an Affine Transformation to provide rotation only, and thus the Affine matrix of embodiments will become:

$$\begin{bmatrix} \cos(\theta) & -\sin(\theta) & 0 \\ \sin(\theta) & \cos(\theta) & 0 \\ 0 & 0 & 1 \end{bmatrix},$$

where θ is rotation angle in counter-clockwise.

A template unit size is determined at block 107 based upon the spacing of peaks identified as corresponding to centers of putative pattern units of the multi-unit aggregation in the tessellated source image. For example, processing to determine one or more peak intervals with respect to peaks 801 of peak map 800 may be performed to determine a width (w) and a height (h) of the template unit. In operation according to embodiments, a vector statistical method may be used to determine the peak interval in the horizontal and vertical directions, wherein the horizontal and vertical peak intervals may be used to provide the size of a single template unit (e.g., horizontal peak interval=w, and vertical peak interval=h).

Figure 10A:
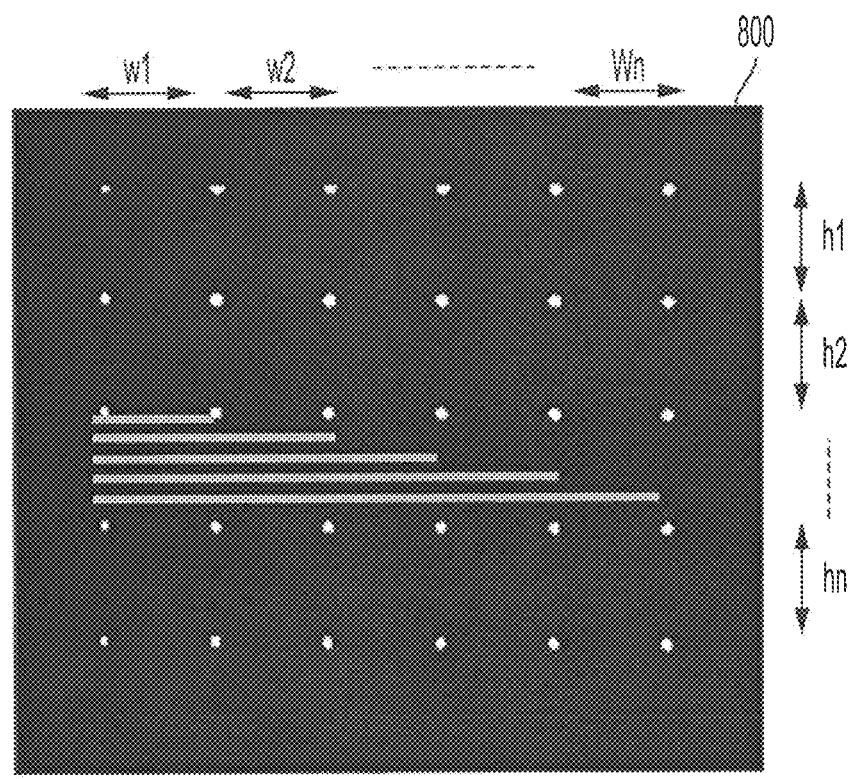
FIGS. 10A and 10B show implementation of a vector statistical method for determining a template unit size in accordance with embodiments of the present invention.
Figure 10B:
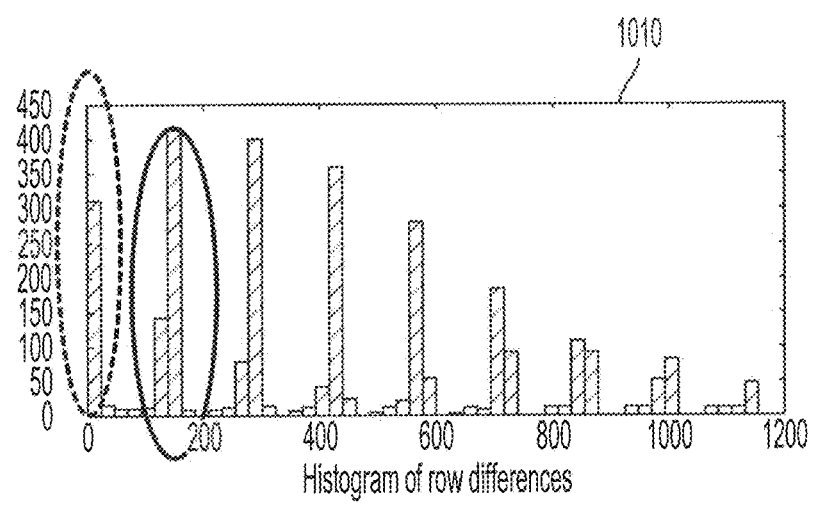
Figure 10B:
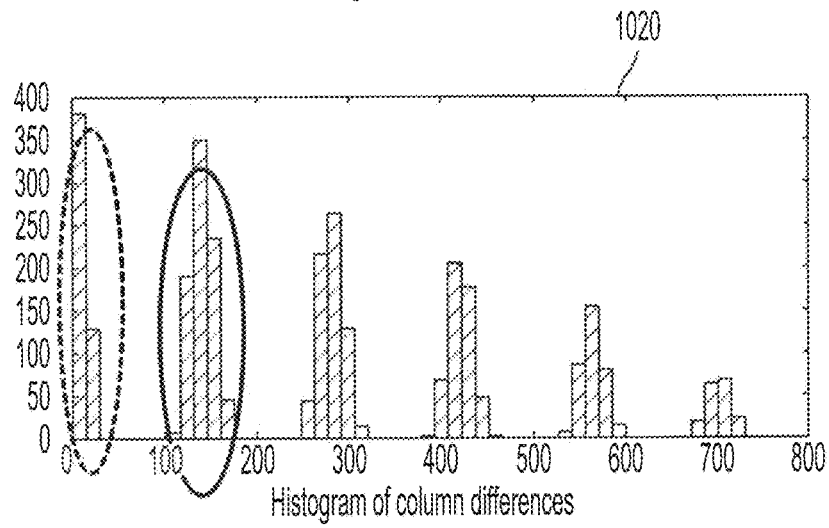

Implementation of a vector statistical method in accordance with embodiments of the invention is illustrated in FIGS. 10A and 10B. As shown in FIG. 10A, peak intervals may be determined with respect to the peaks of peak map 800. In particular, FIG. 10A illustrates determination of horizontal peak intervals. It should be appreciated that vertical peak intervals may be similarly determined. FIG. 10B illustrates statistical analysis of the peak intervals to determine peak intervals representing the horizontal and vertical size of the template unit. In the illustrated example, the peak intervals for the horizontal peak interval displacement and for the vertical peak interval displacement having the highest statistical number of times of displacement are selected are identified for selection as the width (w) and a height (h) of the template unit. For example, as shown in histogram of row differences graph 1010, data with high statistical frequency are selected (data around 0 are ignored in light of the template unit width being non-zero), and the mean of these data may be used as the row interval (e.g., the width, w, of the template unit). Similarly, as shown in histogram of column differences graph 1020, data with high statistical frequency are selected (data around 0 are ignored in light of the template unit height being non-zero), and the mean of these data may be used as the column interval (e.g., the height, h, of the template). In operation according to embodiments, the determined width and height provides the template unit size utilized in template unit boundary identification according to embodiments of the invention.

At block 108 of flow 100 illustrated in FIG. 1, a location of the template within the source image is determined. For example, operation according to block 108 of embodiments may use the determined template unit size to identify template unit boundaries in the tessellated source image, wherein the template unit boundaries may be relied upon to define a location of the template within the source image. Referring again to FIG. 2, flow 200 illustrates operation according to exemplary embodiments of block 108 using the determined template unit size to define pixel analysis line segments for identifying template unit boundaries in the tessellated image.

Template unit boundary identification techniques of embodiments are configured to accommodate various configurations of 2D rectangular tessellated images. For example, tessellated source images having vertically and horizontally aligned pattern units (shown in the example source image of FIG. 11A), vertically staggered and horizontally aligned pattern units (shown in the example source image of FIG. 11B), and/or vertically aligned and horizontally staggered pattern units (shown in the example source image of FIG. 11C) may be accommodated by embodiments of a template unit boundary identification technique in accordance with concepts of the present invention. As will be better understood from the discussion that follows, flow 200 of the embodiment illustrated in FIG. 2 is configured to accommodate each of the above mentioned tessellated image configurations.

Figure 11A:
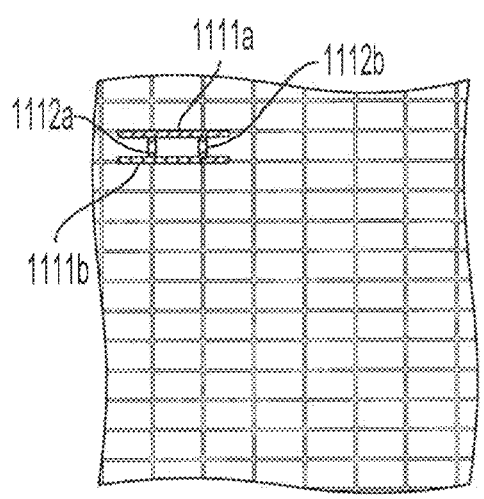
FIGS. 11A-11C show utilization of a plurality of pixel analysis line segments configured for identifying boundaries of a template unit in accordance with embodiments of the present invention.
Figure 11B:
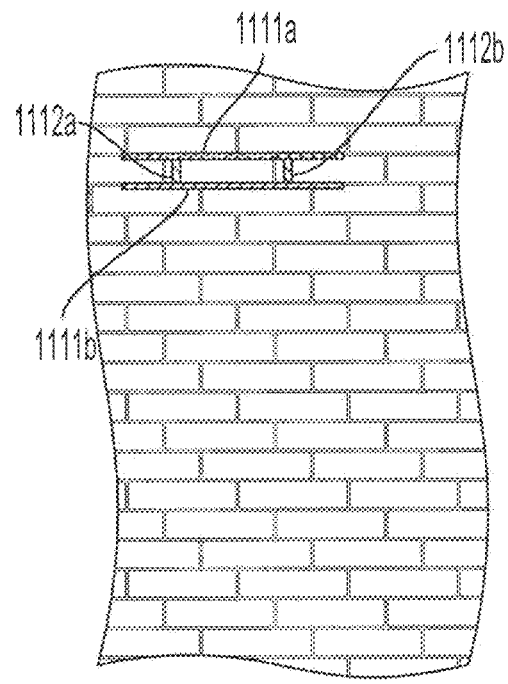

At block 201 of flow 200 shown in FIG. 2, horizontal pixel analysis line segments are defined according to a first configuration, wherein the first configuration may be based at least in part on the size of the template unit. For example, a plurality of horizontal pixel analysis line segments may be defined to have a vertical spacing equal to the template unit height (h) of the determined template unit size. Additionally or alternatively, the plurality of horizontal pixel analysis line segments may be defined to each have a length based upon the template unit width (w) of the determined template unit size. In accordance with embodiments of the invention, the horizontal pixel analysis line segment length of the first configuration is greater than the template unit width (w) (e.g., 2·w) in order to provide sampling of pixels within the source image for reliable boundary analysis. Examples of horizontal pixel analysis line segments defined according to a first configuration are shown as horizontal pixel analysis line segments 1111a and 1111b in FIGS. 11A and 11B. In the examples of FIGS. 11A and 11B, the plurality of horizontal pixel analysis line segments comprises 2 horizontal pixel analysis line segments and the length of the horizontal pixel analysis line segments comprises 2·w.

In operation according to embodiments, pixels corresponding to positions of the plurality of horizontal pixel analysis line segments are analyzed with respect to predetermined criteria to identify horizontal (e.g., top and bottom) boundaries of the template. Accordingly, at block 202 of the illustrated embodiment, pixels of the source image (e.g., normalized source image 430) corresponding to the horizontal pixel analysis line segments are analyzed as the horizontal pixel analysis line segments are slid vertically over the source image. For example, as shown in FIGS. 12A-12C, juxtaposed horizontal pixel analysis line segments 1111a and 1111b may be slid down vertically over normalized source image 430 and the pixels of the source image corresponding to various positions of the horizontal pixel analysis line segments analyzed for predetermined criteria. The starting position for sliding, the horizontal pixel analysis line segments may be any desired position within the source image. Embodiments may, for example, select a position near the top of the source image (e.g., upper left corner of the source image) to accommodate sliding the horizontal pixel analysis line segments down vertically. Embodiments may additionally or alternatively select a centered position with respect to the source image (e.g., center of the upper edge of the source image, center of the source image, etc.) to avoid fringe effects (e.g., warpage, distortion, etc.) in the source image.

The predetermined criteria used in identifying template unit boundaries according to embodiments may comprise one or more attributes of the pixels. For example, embodiments may analyze the pixels corresponding to the horizontal pixel analysis line segments to determine a position of the horizontal pixel analysis line segments at which the pixels corresponding to the juxtaposed horizontal pixel analysis line segments are substantially uniform (e.g., grey level values of the pixels corresponding to each of the horizontal pixel analysis line segments are substantially uniform). Additionally or alternatively, other statistical tools, such as Standard Deviation, may be utilized in analyzing pixels in identifying template unit boundaries according to embodiments of the invention. Grey level histogram graphs 1201a-1201c of FIGS. 12A-12C illustrate the distribution of grey level values of the pixels corresponding to each of the horizontal pixel analysis line segments. It can be seen from the examples of FIGS. 12A-12C that the grey level values of grey level histogram graphs 1201a and 1201b are distributed, whereas the grey level values of grey level histogram graph 1201c corresponding to the instance where horizontal pixel analysis line segments 1111a and 1111b have slid into alignment with the interface between rows of pattern units are uniform.

The position at which pixels corresponding to positions of the plurality of horizontal pixel analysis line segments are determined to meet the predetermined criteria (e.g., substantially uniform pixels in the foregoing example) may be utilized to determine the Y coordinates of the horizontal (e.g., top and bottom) boundaries of the template within the source image. Accordingly, at block 203 of the illustrated embodiment of flow 200, a determination is made as to whether the Y coordinates of the horizontal boundaries of the template have been identified.

If the determination at block 203 of the illustrated embodiment indicates that the Y coordinates of the horizontal boundaries of the template have been identified, processing proceeds to block 204 for further processing to identify the X coordinates of the vertical boundaries of the template. At block 204 of the illustrated embodiment, vertical pixel analysis line segments are defined according to a second configuration, wherein the second configuration may be based at least in part on the size of the template unit. For example, a plurality of vertical pixel analysis line segments may be defined to have a horizontal spacing equal to the template unit width (w) of the determined template unit size. Additionally or alternatively, the plurality of vertical pixel analysis line segments may be defined to each have a length based upon the template unit height (h) of the determined template unit size. In accordance with embodiments of the invention, the vertical pixel analysis line segment length of the second configuration is equal to the template unit height (h) because the Y coordinates of the horizontal boundaries of the template may be used to position the vertical pixel analysis line segments vertically within the source image to correspond to a row of pattern units. Examples of vertical pixel analysis line segments defined according to a second configuration are shown as vertical pixel analysis line segments 1112a and 1112b FIGS. 11A and 11B. In the examples of FIGS. 11A and 11B, the plurality of vertical pixel analysis line segments comprises 2 vertical pixel analysis line segments and the length of the vertical pixel analysis line segments comprises h.

In operation according to embodiments, pixels corresponding to positions of the plurality of vertical pixel analysis line segments are analyzed with respect to predetermined criteria to identify vertical (e.g., left and right) boundaries of the template. Accordingly, at block 205 of the illustrated embodiment, pixels of the source image (e.g., normalized source image 430) corresponding to the vertical pixel analysis line segments are analyzed as the vertical pixel analysis line segments are slid horizontally over the source image. For example, as shown in FIGS. 13A-13C, juxtaposed vertical pixel analysis line segments 1112a and 1112b may be slid right horizontally over normalized source image 430 and the pixels of the source image corresponding to various positions of the vertical pixel analysis line segments analyzed for predetermined criteria. The starting position for sliding the vertical pixel analysis line segments may be any desired position within the source image disposed between the horizontal template unit boundaries identified above. Embodiments may, for example, select a position near the left edge of the source image (e.g., left edge of the source image) to accommodate sliding the vertical pixel analysis line segments right horizontally. Embodiments may additionally or alternatively select a centered position with respect to the source image (e.g., center of the pattern unit row of the source image) to avoid fringe effects (e.g., warpage, distortion, etc.) in the source image.

Continuing with the above example, wherein the predetermined criteria used in identifying template unit boundaries comprises substantially uniform pixels, embodiments may analyze the pixels corresponding to the vertical pixel analysis line segments to determine a position of the vertical pixel analysis line segments at which the pixels corresponding to the juxtaposed vertical pixel analysis line segments are substantially uniform (e.g., grey level values of the pixels corresponding to each of the vertical pixel analysis line segments are substantially uniform). Grey level histogram graphs 1301a-1301c of FIGS. 13A-13C illustrate the distribution of grey level values of the pixels corresponding to each of the horizontal pixel analysis line segments. It can be seen from the examples of FIGS. 13A-13C that the grey level values of grey level histogram graphs 1301b and 1301c are distributed, whereas the grey level values of grey level histogram graph 1301a corresponding to the instance where vertical pixel analysis line segments 1112a and 1112b are in alignment with the interface between columns of pattern units are uniform.

The position at which pixels corresponding to positions of the plurality of vertical pixel analysis line segments are determined to meet the predetermined criteria (e.g., substantially uniform pixels in the foregoing example) may be utilized to determine the X coordinates of the vertical (e.g., right and left) boundaries of the template within the source image. Accordingly, at block 206 of the illustrated embodiment of flow 200, a determination is made as to whether the X coordinates of the horizontal boundaries of the template have been identified.

If the determination at block 206 of the illustrated embodiment indicates that the X coordinates of the vertical boundaries of the template have been identified, processing proceeds to block 213 for processing to defining a bounding box of the template unit. For example, the X and Y coordinates identified above may be used to identify the bounding box for the template according to embodiments (e.g., bounding box 1301 incarcerating a portion of normalized source image 430 providing template image 1302 shown in FIG. 13).

Figure 11C:
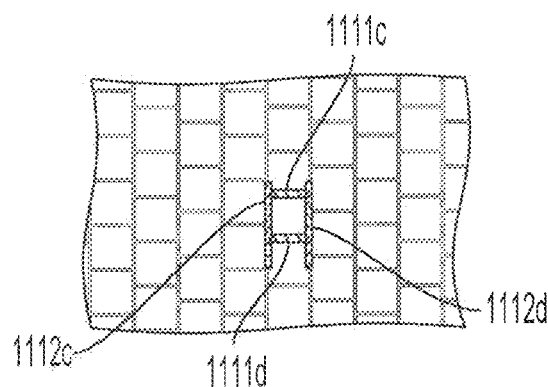

Returning again to the determination regarding having identified the Y coordinates, if the determination at block 203 of the illustrated embodiment indicates that the Y coordinates of the horizontal boundaries of the template have not been identified, processing proceeds to block 207 for alternative processing to identify the X coordinates of the vertical boundaries of the template. As an example, the tessellated source image may comprise vertically aligned, but horizontally staggered, pattern units (such as shown in FIG. 11C), whereby analysis of pixels corresponding to positions of the plurality of horizontal pixel analysis line segments with respect to predetermined criteria fail to identify horizontal boundaries of the template (e.g., the analysis does not identify a position having substantially uniform pixels). At block 207 of the illustrated embodiment, vertical pixel analysis line segments are defined according to a third configuration, wherein the third configuration may be based at least in part on the size of the template unit. For example, a plurality of vertical pixel analysis line segments may be defined to have a horizontal spacing equal to the template unit width (w) of the determined template unit size. Additionally or alternatively, the plurality of vertical pixel analysis line segments may be defined to each have a length based upon the template unit height (h) of the determined template unit size. In accordance with embodiments of the invention, the vertical pixel analysis line segment length of the third configuration is greater than the template unit height (h) (e.g., 2·h) in order to provide sampling of pixels within the source image for reliable boundary analysis. An example of vertical pixel analysis line segments defined according to a third configuration are shown as vertical pixel analysis line segments 1112c and 1112d in FIG. 11C. In the example of FIG. 11C, the plurality of vertical pixel analysis line segments comprises 2 vertical pixel analysis line segments and the length of the vertical pixel analysis line segments comprises 2·h.

In operation according to embodiments, pixels corresponding to positions of the plurality of vertical pixel analysis line segments are analyzed with respect to predetermined criteria to identify vertical (e.g., left and right) boundaries of the template. Accordingly, at block 208 of the illustrated embodiment, pixels of the source image (e.g., normalized source image 430) corresponding to the vertical pixel analysis line segments are analyzed as the vertical pixel analysis line segments are slid horizontally over the source image. For example, similar to the illustrations of FIGS. 13A-13C, juxtaposed vertical pixel analysis line segments 1112c and 1112d may be slid right horizontally over normalized source image 430 and the pixels of the source image corresponding to various positions of the vertical pixel analysis line segments analyzed for predetermined criteria. The starting position for sliding the vertical pixel analysis line segments may be any desired position within the source image. Embodiments may, for example, select a position near the left edge of the source image (e.g., upper left corner of the source image) to accommodate sliding the vertical pixel analysis line segments right horizontally. Embodiments may additionally or alternatively select a centered position with respect to the source image (e.g., center of the left edge of the source image, center of the source image, etc.) to avoid fringe effects (e.g., warpage, distortion, etc.) in the source image.

Continuing with the above example, wherein the predetermined criteria used in identifying template unit boundaries comprises substantially uniform pixels, embodiments may analyze the pixels corresponding to the vertical pixel analysis line segments to determine a position of the vertical pixel analysis line segments at which the pixels corresponding to the juxtaposed vertical pixel analysis line segments are substantially uniform (e.g., grey level values of the pixels corresponding to each of the vertical pixel analysis line segments are substantially uniform). For example, where vertical pixel analysis line segments 1112c and 1112d are in alignment with the interface between columns of pattern units, the grey level values of the pixels may be determined to be uniform.

The position at which pixels corresponding to positions of the plurality of vertical pixel analysis line segments are determined to meet the predetermined criteria (e.g., substantially uniform pixels in the foregoing example) may be utilized to determine the X coordinates of the vertical (e.g., right and left) boundaries of the template within the source image. Accordingly, at block 209 of the illustrated embodiment of flow 200, a determination is made as to whether the X coordinates of the horizontal boundaries of the template have been identified.

If the determination at block 209 of the illustrated embodiment indicates that the X coordinates of the vertical boundaries of the template have been identified, processing proceeds to block 210 for further processing to identify the Y coordinates of the horizontal boundaries of the template. At block 210 of the illustrated embodiment, horizontal pixel analysis line segments are defined according to a fourth configuration, wherein the fourth configuration may be based at least in part on the size of the template unit. For example, a plurality of horizontal pixel analysis line segments may be defined to have a vertical spacing equal to the template unit height (h) of the determined template unit size. Additionally or alternatively, the plurality of horizontal pixel analysis line segments may be defined to each have a length based upon the template unit width (w) of the determined template unit size. In accordance with embodiments of the invention, the horizontal pixel analysis line segment length of the first configuration is equal to the template unit width (w) because the X coordinates of the vertical boundaries of the template may be used to position the horizontal pixel analysis line segments horizontally within the source image to correspond to a column of pattern units. An example of horizontal pixel analysis line segments defined according to a fourth configuration are shown as horizontal pixel analysis line segments 1111c and 1111d in FIG. 11C. In the example of FIG. 11C, the plurality of horizontal pixel analysis line segments comprises 2 horizontal pixel analysis line segments and the length of the horizontal pixel analysis line segments comprises w.

In operation according to embodiments, pixels corresponding to positions of the plurality of horizontal pixel analysis line segments are analyzed with respect to predetermined criteria to identify horizontal (e.g., top and bottom) boundaries of the template. Accordingly, at block 211 of the illustrated embodiment, pixels of the source image (e.g., normalized source image 430) corresponding to the horizontal pixel analysis line segments are analyzed as the horizontal pixel analysis line segments are slid vertically over the source image. For example, similar to the illustrations of FIGS. 12A-12C, juxtaposed horizontal pixel analysis line segments 1111c and 1111d may be slid down vertically over normalized source image 430 and the pixels of the source image corresponding to various positions of the horizontal pixel analysis line segments analyzed for predetermined criteria. The starting position for sliding the horizontal pixel analysis line segments may be any desired position within the source image disposed between the vertical template unit boundaries identified above. Embodiments may, for example, select a position near the top of the source image (e.g., top edge of the source image) to accommodate sliding the horizontal pixel analysis line segments down vertically. Embodiments may additionally or alternatively select a centered position with respect to the source image (e.g., center of the pattern unit column of the source image) to avoid fringe effects (e.g., warpage, distortion, etc.) in the source image.

Continuing with the above example, wherein the predetermined criteria used in identifying template unit boundaries comprises substantially uniform pixels, embodiments may analyze the pixels corresponding to the horizontal pixel analysis line segments to determine a position of the horizontal pixel analysis line segments at which the pixels corresponding to the juxtaposed horizontal pixel analysis line segments are substantially uniform (e.g., grey level values of the pixels corresponding to each of the vertical pixel analysis line segments are substantially uniform). For example, where horizontal pixel analysis line segments 1111c, and 1111d are in alignment with the interface between rows of pattern units, the grey level values of the pixels may be determined to be uniform The position at which pixels corresponding to positions of the plurality of horizontal pixel analysis line segments are determined to meet the predetermined criteria (e.g., substantially uniform pixels in the foregoing example) may be utilized to determine the Y coordinates of the horizontal (e.g., top and bottom) boundaries of the template within the source image. Accordingly, at block 212 of the illustrated embodiment of flow 200, a determination is made as to whether the Y coordinates of the horizontal boundaries of the template have been identified.

If the determination at block 212 of the illustrated embodiment indicates that the Y coordinates of the horizontal boundaries of the template have been identified, processing proceeds to block 213 for processing to defining a bounding box of the template unit. For example, the X and Y coordinates identified above may be used to identify the bounding box for the template according to embodiments.

Returning again to the determinations regarding having not identified the X coordinates at blocks 206 and 209 and the determination regarding having not identified the Y coordinates at block 212, processing proceeds to block 214 for template coordinate identification failure processing according to embodiments. For example, if the determination at block 206 of the illustrated embodiment indicates that the X coordinates of the vertical boundaries of the template have not been identified, processing according to flow 200 has identified Y coordinates but has failed to identify X coordinates for the bounding box of the template and thus a complete location of the template within source image has not been determined. Similarly, if the determination at block 212 of the illustrated embodiment indicates that the Y coordinates of the horizontal boundaries of the template have not been identified, processing according to flow 200 has identified X coordinates but has failed to identify Y coordinates for the bounding box of the template and thus a complete location of the template within source image has not been determined. If the determination at block 209 of the illustrated embodiment indicates that the X coordinates of the vertical boundaries of the template have not been identified, processing according to flow 200 has failed to identify both Y coordinates and X coordinates for the bounding box of the template and thus a location of the template within source image has not been determined. Accordingly, processing at block 214 may provide an error state to terminate the template unit boundary identification processing with respect to the source image. Alternatively, processing at block 214 may provide processing to attempt failure recovery. In an example of failure recovery processing, a determination may be made as to whether the analyzing of pixels of the source image by sliding horizontal pixel analysis line segments vertically block 202) or the analyzing of pixels of the source image by sliding vertical pixel analysis line segments horizontally (e.g., block 208) indicates more uniform positions within the image. If the analyzing of pixels of the source image by sliding horizontal pixel analysis line segments vertically (e.g., block 202) indicates more uniform positions within the image, failure recovery processing may use those results and proceed to analyze pixels of the source image by sliding the vertical pixel analysis line segments horizontally over the source image (e.g., blocks 204 and 205). However, if the analyzing of pixels of the source image by sliding vertical pixel analysis line segments horizontally (e.g., block 208) indicates more uniform positions within the image, failure recovery may use those results and proceed to analyze pixels of the sour image by sliding the horizontal pixel analysis line segments vertically over the source image (e.g., blocks 210 and 211).

It can be appreciated from the foregoing that processing according to flow 200 of the illustrated embodiment initially operates (blocks 201-203) to attempt to determine the Y coordinates of the horizontal (e.g., top and bottom) boundaries of the template within the source image, wherein operation (blocks 204-206) to attempt to determine the X coordinates of the vertical (e.g., left and right) boundaries of the template is performed thereafter. If, however, operation (blocks 201-203) attempting to determine the Y coordinates of the horizontal boundaries of the template are unsuccessful, processing according to flow 200 of the illustrated embodiment operates (blocks 207-209) to instead attempt to determine the X coordinates of the vertical boundaries of the template, wherein operation (blocks 210-212) to attempt to determine the Y coordinates of the vertical boundaries of the template is performed thereafter. This X/Y coordinate determination processing is configured to accommodate each of the above mentioned tessellated image configurations (e.g., template unit boundaries of vertically and horizontally aligned pattern units and of vertically staggered and horizontally aligned pattern units identified by operation of blocks 201-206 and template unit boundaries of vertically aligned and horizontally staggered pattern units identified by operation of blocks 207-212). It should be appreciated, however, that the order of horizontal and vertical boundary determinations may be different than that of flow 200 illustrated in FIG. 2 (e.g., switching the horizontal pixel analysis line segment analysis and associated Y coordinate identification with the vertical pixel analysis line segment analysis and associated X coordinate identification) according to embodiments.

Template unit boundaries identified according to embodiments may be utilized to retrieve (e.g., identify, select, and/or capture) a template image from the tessellated source image. Accordingly, referring again to FIG. 1, after a location of the template within the source image is determined at block 108 (e.g., operation according to flow 200 of FIG. 2 using the identified X and Y coordinates to identify the bounding box for the template), processing according to flow 100 of the illustrated embodiment proceeds to block 109 for processing to obtain the template image from the source image. For example, the template unit bounding box (e.g., having the template unit size and template unit horizontal and vertical boundary locations determined above) may be used to identify the area of normalized source image 430 comprising the template image, whereby that portion of normalized source image 430 may be retrieved for use as the template image.

Template images obtained according to embodiments of the invention may, for example, be used in template matching techniques to locate the positions the individual pattern units of the multi-unit aggregations within tessellated images. Accordingly, at block 110 of the illustrated embodiment, the template image is used to locate one or more pattern units within the source image. For example, a template matching technique may be utilized with respect to template image 1302 and normalized source image 430 to locate individual pattern units of the tessellated image.

Although the use of a normalized source image is described in examples above, other forms of source image may be utilized by various processes of a template unit boundary identification technique and/or template matching technique herein. For example, although a bounding box for a template image may be determined through reference to a normalized source image, embodiments of the invention may nevertheless utilized the template unit bounding box with respect to the original source image (e.g., source image 410) and/or intermediate processed source image (e.g., grey scale source image 420) to obtain the template image from another or alternative form of source image.

It should be appreciated that, the pattern units of an multi-unit aggregation may not appear completely uniform within a tessellated image. For example, poor image capture techniques may result in source images having fringe effects (e.g., pattern units disposed toward one or more edge of the source image having one or more non-uniform attribute, as shown in "fuzzy boarder" example of FIG. 14A), warping (e.g., pattern units bent or twisted out of shape, as shown in the warping example of FIG. 14B), lens effects (e.g., distorted pattern units, as shown in the barrel distortion of FIG. 14C or pincushion distortion of FIG. 14D), etc. Accordingly, embodiments enable dynamic template image updating to provide for adapting a template image to accommodate pattern unit anomalies (e.g., fuzzy border, distortion, etc.) within the multi-unit aggregation of the tessellated image.

Figure 15:
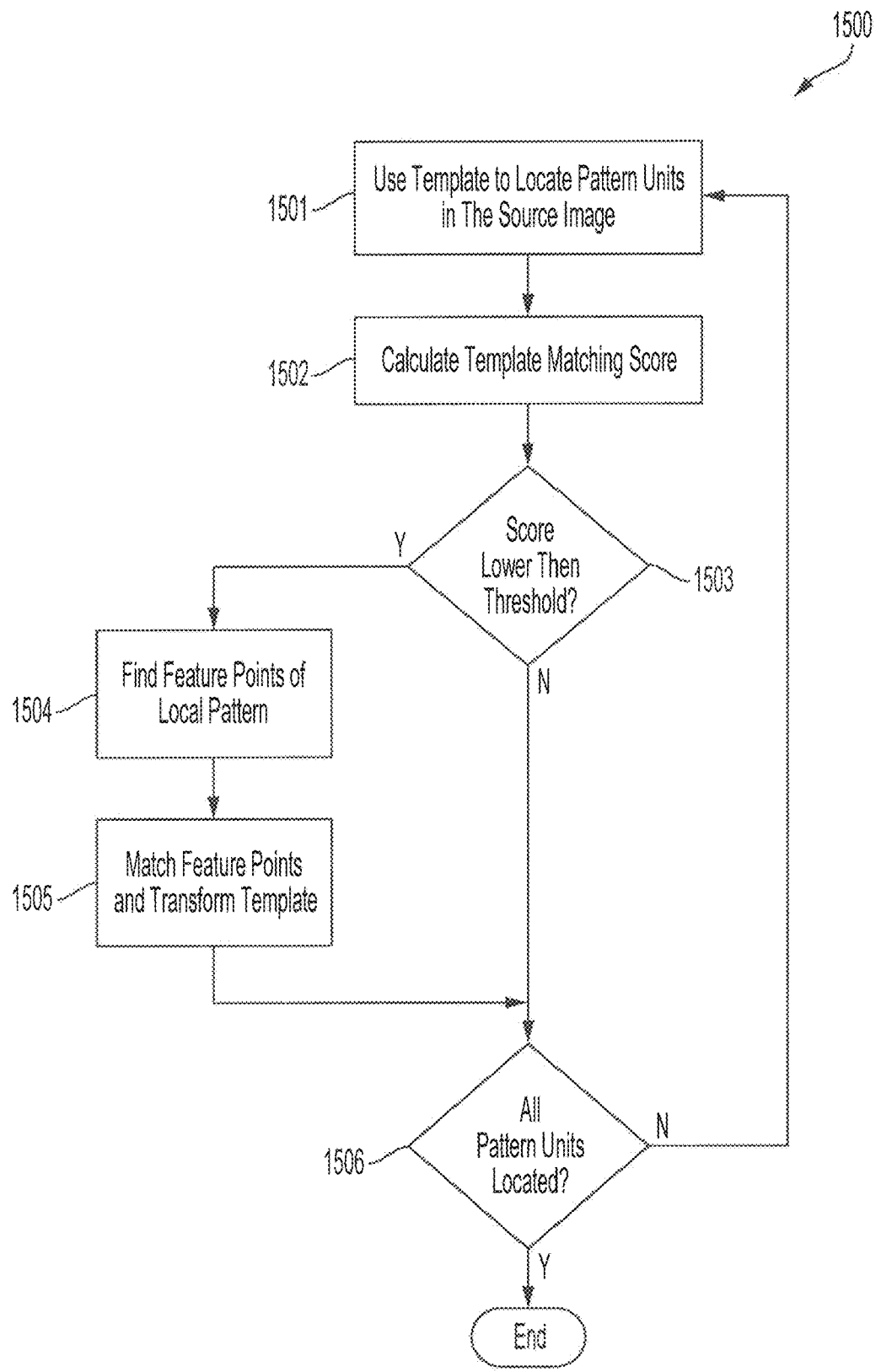
FIG. 15 shows a flow diagram providing operation for dynamic template image updating according to embodiments of the present invention.

FIG. 15 shows flow 1500 providing operation for dynamic template image updating according to embodiments of the invention. The dynamic template image updating provided according to embodiments of flow 1500 may, for example, be implemented with respect to a template matching technique utilized to locate individual pattern units of a tessellated image. For example, processing according to flow 1500 may be implemented at block 110 of flow 100 described above to provide dynamic template image updating, such as to provide for adapting a template image to accommodate pattern unit anomalies (e.g., fuzzy border, distortion, etc.) within the multi-unit aggregation of the tessellated image.

It should be appreciated that, when implemented in software, the functions of flow 1500 providing aspects of dynamic template image updating of embodiments of the present invention may comprise code segments to perform the tasks as described herein. The code segments can be stored in a processor readable medium (e.g., an electronic circuit, a semiconductor memory device, a ROM, a flash memory, an EROM, an optical disk, a hard disk, etc.) for execution by one or more processors of a processor-based system (e.g., processor-based system 300 of FIG. 3). The code segments may be downloaded via computer networks such as a LAN, a WAN the Internet, an intranet, a cellular communication network, etc.

At block 1501 of the embodiment illustrated in FIG. 15, a template image is used to locate one or more pattern units within a source image. For example, a template matching technique may be utilized with respect to template image 1302 and normalized source image 430 to locate individual pattern units of the tessellated image, as discussed with respect to block 110 of FIG. 1.

A template image matching score is calculated for each match of the template image to a portion of the source image at block 1502. For example, when a location within the source image substantially corresponding to the template image is identified, such as through use of the aforementioned template matching technique, a template metrics score may be calculated to indicate a match score (e.g., match percentage computation). A matching score may, for example, be calculated by the Normalized Cross Correction method $$R(x, y) = \frac{\sum_{x',y'} (T(x', y') \cdot I(x+x', y+y'))}{\sqrt{\sum_{x',y'} T(x', y')^2 \cdot \sum_{x',y'} I(x+x', y+y')^2}}, \quad (3)$$

where R is the Normalized Cross Correction result graph, T is the Template Image, I is the Source Image, x and y is the coordinate of the Normalized Cross Correction result graph R, x' and y' is the coordinate of the Template Image T.

At block 1503 a determination is made regarding whether the matching score meets a match threshold. For example, a predetermined match threshold (e.g., match percentage threshold of 80%) may be provided for determining if a template image match within the source image is of sufficient quality to continue to use the template image or is of lesser quality so that a new or revised template image if the matching score is to be dynamically updated (e.g., updated for use with respect to some or all of a remaining portion of the source image, for use with respect to one or more subsequently processed source images, etc.).

If, at block 1503, it is determined that the matching score meets or exceeds the match threshold, processing according to the illustrated embodiment proceeds to block 1506 for a determination regarding whether all pattern units have been located within the multi-unit aggregation. For example, if all pattern units have been located within the multi-unit aggregation of a tessellated source image, processing according to the dynamic template image updating operation of flow 1500 may end (e.g., to proceed to template matching processing with respect to a subsequent source image). However, if all pattern units have not been located within the multi-unit aggregation, processing according to the dynamic template image updating operation of flow 1500 may return to block 1501 for continued operation to locate one or more pattern units within a source image.

If, however, it is determined at block 1503 that the matching score does not meet the match threshold, processing according to the illustrated embodiment proceeds to block 1504 for operation to dynamically update the template image. For example, at block 1504 of the illustrated embodiment, the portion of the source image identified as matching the template image, and having a matching score less than the match threshold (e.g., due to distortion etc. of the instance of the pattern unit within the source image), is analyzed to find features points within the local pattern unit. Such feature points may, for example, comprise corners and/or other features as may be identifiable within the local pattern unit and correspondingly in the template image. As a specific example, Harris Corner Detection may be utilized to find corner features according to embodiments of the invention. At block 1505 of the illustrated embodiment, one or more of the feature points identified in the local pattern unit are matched to corresponding feature points identifiable within the template image and the template image is transformed (e.g., warped, scaled, tilted, shaded, etc.) to more closely match (i.e., update) the local pattern unit. In operation according to embodiments, due to the small size of the template image, the model of the template transformation may be represented by a perspective transformation model. After the template transformation of block 1505, processing according to the illustrated embodiment proceeds to block 1506 for a determination regarding whether all pattern units have been located within the multi-unit aggregation, as discussed above.

As can be appreciated from the foregoing, template unit boundary identification techniques of the present invention may be utilized to implement automated template image retrieval, whereby the processing time for obtaining template images may be reduced and/or more consistent results than previous techniques may be provided. Moreover, embodiments enable dynamic template image updating, such as to provide for adapting a template image to accommodate pattern unit anomalies within the multi-unit aggregation of the tessellated image.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for selecting a template image for a tessellated image, the method comprising:
    analyzing the tessellated image using a sample area image from the tessellated image to determine a template unit size for the template image;
    defining pixel analysis line segments configured for identifying template unit boundaries of the template image based at least in part on the template unit size; and
    selecting the template image based at least in part on the template unit boundaries identified using the pixel analysis line segments.

2. The method of claim 1, wherein the template unit size and the template unit boundaries correspond to a pattern unit of the tessellated image.

3. The method of claim 1, wherein the analyzing the tessellated image using the sample area image from the tessellated image to determine the template unit size comprises:
performing convolution processing with respect to the sample area image and the tessellated image;
identifying one or more peaks corresponding to locations of putative pattern units of the tessellated image from results of the convolution processing; and
determining the template unit size based on a spacing of the one or more peaks.

4. The method of claim 3, wherein the identifying the one or more peaks corresponding to locations of the putative pattern units comprises:
analyzing the results of the convolution processing to identify local maximum peaks.

5. The method of claim 3, wherein the determining the template unit size based on the spacing of the one or more peaks comprises:
performing vector statistical analysis with respect to peak intervals of the one or more peaks corresponding to locations of the putative pattern units in horizontal and vertical directions to obtain the template unit size.

6. The method of claim 3, further comprising:
evaluating an orientation of the one or more peaks corresponding to locations of the putative pattern units to determine if the one or more peaks corresponding to locations of the putative pattern units are oriented in a geometric normal position.

7. The method of claim 3, further comprising:
determining if a number of the one or more peaks corresponding to locations of the putative pattern units meets a predetermined threshold number; and
if the number of the one or more peaks does meet the predetermined threshold number, proceeding to determine the template unit size; or
if the number of the one or more peaks does not meet the predetermined threshold number, selecting a different sized sample area image from the tessellated image and repeating the analyzing the tessellated image to determine a template unit size for the template image using the different sized sample area image.

8. The method of claim 7, wherein the different sized sample area image is of a size smaller than that of the sample area image.

9. The method of claim 1, further comprising:
analyzing pixels of the tessellated image corresponding to positions of a plurality of pixel analysis line segments of the pixel analysis line segments over the tessellated image; and
identifying individual template unit boundaries of the template image based upon the analyzing indicating pixels of the tessellated image corresponding to a position of ones of the plurality of pixel analysis line segments meeting predetermined criteria.

10. The method of claim 9, wherein the identifying individual template unit boundaries of the template image based upon the analyzing indicating pixels of the tessellated image corresponding to a position of ones of the plurality of pixel analysis line segments meeting predetermined criteria comprises:
determining that data of histograms of the pixels of the tessellated image corresponding to a position of a plurality of pixel analysis line segments have a same attribute.

11. The method of claim 9, wherein the plurality of pixel analysis line segments are configured based at least in part on the template unit size.

12. The method of claim 11, wherein the plurality of pixel analysis line segments comprise a plurality of horizontal pixel analysis line segments spaced apart vertically a height of the template unit size.

13. The method of claim 12, wherein the plurality of horizontal pixel analysis line segments have lengths greater than a width of the template unit size.

14. The method of claim 11, wherein the plurality of pixel analysis line segments comprise a plurality of vertical pixel analysis line segments spaced apart horizontally a width of the template unit size.

15. The method of claim 14, wherein the plurality of vertical pixel analysis line segments have lengths greater than a height of the template unit size.

16. The method of claim 9, further comprising:
sliding the plurality of pixel analysis line segments over the tessellated image, wherein the positions of the plurality of pixel analysis line segments analyzed for meeting the predetermined criteria to identify the individual template unit boundaries comprise sliding positions of the plurality of pixel analysis line segments.

17. The method of claim 1, further comprising:
using the template image to locate individual pattern units within the tessellated image.

18. The method of claim 17, further comprising:
computing a template matching score with respect to a match of the template image to an instance of a pattern unit within the tessellated image;
determining if the template matching score meets a predetermined threshold score; and
if the template matching score does not meet the predetermined threshold score, dynamically updating the template image.

19. The method of claim 18, wherein the dynamically updating the template image comprises:
matching feature points of the instance of the pattern unit with feature points of the template image; and
transforming the template image to more closely match the instance of the pattern unit.

20. A method for selecting a template image for a tessellated image, the method comprising:
analyzing the tessellated image using a sample area image from the tessellated image to determine a template unit size for the template image;
defining a plurality of pixel analysis line segments configured for identifying template unit boundaries of the template image based upon the template unit size;
sliding the plurality of pixel analysis line segments over the tessellated image;
analyzing pixels of the tessellated image corresponding to positions of a plurality of pixel analysis line segments of the pixel analysis line segments as slid over the tessellated image;
identifying individual template unit boundaries of the template image based upon the analyzing indicating pixels of the tessellated image corresponding to a position of ones of the plurality of pixel analysis line segments meeting predetermined criteria; and
selecting the template image based at least in part on the individual template unit boundaries identified based upon the analyzing.

21. The method of claim 20, wherein the analyzing the tessellated image using the sample area image from the tessellated image to determine the template unit size comprises:
   performing convolution processing with respect to the sample area image and the tessellated image;
   identifying one or more peaks corresponding to locations of putative pattern units of the tessellated image by analyzing the results of the convolution processing to identify local maximum peaks; and
   determining the template unit size based on a spacing of the one or more peaks by performing vector statistical analysis with respect to peak intervals of the one or more peaks corresponding to locations of the putative pattern units in horizontal and vertical directions to obtain the template unit size.

22. The method of claim 21, further comprising:
   determining if a number of the one or more peaks corresponding to locations of the putative pattern units meets a predetermined threshold number; and
   if the number of the one or more peaks does meet the predetermined threshold number, proceeding to determine the template unit size; or
   if the number of the one or more peaks does not meet the predetermined threshold number, selecting a smaller sized sample area image from the tessellated image and repeating the analyzing the tessellated image to determine a template unit size for the template image using the smaller sized sample area image.

23. The method of claim 20, wherein the identifying individual template unit boundaries of the template image based upon the analyzing indicating pixels of the tessellated image corresponding to a position of ones of the plurality of pixel analysis line segments meeting predetermined criteria comprises:
   determining that data of histograms of the pixels of the tessellated image corresponding to a position of a plurality of pixel analysis line segments have a same attribute.

24. The method of claim 20, wherein the plurality of pixel analysis line segments are configured based at least in part on the template unit size.

25. The method of claim 24, wherein the plurality of pixel analysis line segments comprise a plurality of horizontal pixel analysis line segments spaced apart vertically a height of the template unit size.

26. The method of claim 25, wherein the plurality of horizontal pixel analysis line segments have lengths greater than a width of the template unit size.

27. The method of claim 20, wherein the plurality of pixel analysis line segments comprise a plurality of vertical pixel analysis line segments spaced apart horizontally a width of the template unit size.

28. The method of claim 27, wherein the plurality of vertical pixel analysis line segments have lengths greater than a height of the template unit size.

29. The method of claim 20, further comprising:
   using the template image to locate individual pattern units within the tessellated image.

30. The method of claim 29, further comprising:
   computing a template matching score with respect to a match of the template image to an instance of a pattern unit within the tessellated image;
   determining if the template matching score meets a predetermined threshold score; and
   if the template matching score does not meet the predetermined threshold score, dynamically updating the template image.

31. The method of claim 30, wherein the dynamically updating the template image comprises:
   matching feature points of the instance of the pattern unit with feature points of the template image; and
   transforming the template image to more closely match the instance of the pattern unit.

32. A system for selecting a template image for a tessellated image, the system comprising:
   a memory; and
   at least one processor in communication with the memory, wherein the at least one processor is configured to;
   analyze the tessellated image using a sample area image from the tessellated image to determine a template unit size for the template image;
   define a plurality of pixel analysis line segments configured for identifying template unit boundaries of the template image based upon the template unit size;
   slide the plurality of pixel analysis line segments over the tessellated image;
   analyze pixels of the tessellated image corresponding to positions of a plurality of pixel analysis line segments of the pixel analysis line segments as slid over the tessellated image;
   identify individual template unit boundaries of the template image based upon the analyzing pixels of the tessellated image corresponding to a position of ones of the plurality of pixel analysis line segments meeting predetermined criteria; and
   select the template image based at least in part on the individual template unit boundaries identified based upon the analyzing.

33. The system of claim 32, wherein the at least one processor is further configured to:
   perform convolution processing with respect to the sample area image and the tessellated image;
   identify one or more peaks corresponding to locations of putative pattern units of the tessellated image by analyzing the results of the convolution processing to identify local maximum peaks; and
   determine the template unit size based on a spacing of the one or more peaks by performing vector statistical analysis with respect to peak intervals of the one or more peaks corresponding to locations of the putative pattern units in horizontal and vertical directions to obtain the template unit size.

34. The system of claim 33, wherein the at least one processor is further configured to:
   determine if a number of the one or more peaks corresponding to locations of the putative pattern units meets a predetermined threshold number; and
   proceed to determine the template unit size if the number of the one or more peaks does meet the predetermined threshold number; or
   select a smaller sized sample area image from the tessellated image and repeating the analyzing the tessellated image to determine a template unit size for the template image using the smaller sized sample area image if the number of the one or more peaks does not meet the predetermined threshold number.

35. The system of claim 32, wherein the at least one processor is further configured to:
   use the template image to locate individual pattern units within the tessellated image;

compute a template matching score with respect to a match of the template image to an instance of a pattern unit within the tessellated image;

determine if the template matching score meets a predetermined threshold score; and dynamically update the template image if the template matching score does not meet the predetermined threshold score.

\* \* \* \* \*

UNITED STATES PATENT AND TRADEMARK OFFICE
CERTIFICATE OF CORRECTION

PATENT NO. : 11,023,770 B2
APPLICATION NO. : 16/579111
DATED : June 1, 2021
INVENTOR(S) : Tian Qiu et al.

It is certified that error appears in the above-identified patent and that said Letters Patent is hereby corrected as shown below:

In the Specification

At Column 3, Line number 30, delete "figures, it" and replace with --figures. It--.
At Column 7, Line number 20, delete "size in" and replace with --size m--.
At Column 7, Line number 39, delete "up top" and replace with --up to--.
At Column 7, Line number 60, delete "size in" and replace with --size m--.
At Column 8, Line number 20, delete "images the sample" and replace with --images (i.e., the sample--.
At Column 8, Line number 61, delete "threshold 2" and replace with --threshold = 2--.
At Column 11, Line number 61, delete "sliding, the horizontal" and replace with --sliding the horizontal--.
At Column 12, Line number 63, delete "1112b FIGS. 11A and 11B" and replace with --1112b in FIGS. 11A and 11B--.
At Column 13, Line number 67, delete "FIG. 13" and replace with --FIG. 13A--.
At Column 17, Line number 6, delete "vertically block 202" and replace with --vertically (e.g., block 202--.
At Column 18, Line number 66, delete "a WAN the Internet" and replace with --a WAN, the Internet--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*